United States Patent
Kanuganti et al.

(10) Patent No.: US 11,366,634 B2
(45) Date of Patent: *Jun. 21, 2022

(54) MEMORY RETENTION SYSTEM

(71) Applicant: Human AI Labs, Inc., San Diego, CA (US)

(72) Inventors: Suman Kanuganti, San Diego, CA (US); Xiaoran Zhang, San Diego, CA (US); Kristie Kaiser, San Diego, CA (US)

(73) Assignee: Human AI Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,988

(22) Filed: Dec. 8, 2021

(65) Prior Publication Data

US 2022/0113937 A1    Apr. 14, 2022

Related U.S. Application Data

(63) Continuation of application No. 17/381,046, filed on Jul. 20, 2021, now Pat. No. 11,226,787, which is a
(Continued)

(51) Int. Cl.
*G06F 3/16* (2006.01)
*G06F 16/23* (2019.01)
*G06F 12/02* (2006.01)

(52) U.S. Cl.
CPC .......... *G06F 3/167* (2013.01); *G06F 12/0223* (2013.01); *G06F 16/2379* (2019.01); *G06F 2212/17* (2013.01)

(58) Field of Classification Search
None
See application file for complete search history.

(56) References Cited

U.S. PATENT DOCUMENTS

| 5,845,300 A | 12/1998 | Comer et al. |
| 11,099,813 B2 | 8/2021 | Kobayashi et al. |

(Continued)

OTHER PUBLICATIONS

International Search Report and Written Opinion for International Patent Application No. PCT/US2021/019674 dated May 6, 2021, 11 pages.
(Continued)

*Primary Examiner* — Craig C Dorais
(74) *Attorney, Agent, or Firm* — Morrison & Foerster LLP

(57) ABSTRACT

The present disclosure generally relates to a computer-implemented system for intelligently retaining and recalling memory data. An exemplary method comprises receiving, via a microphone of an electronic device, a speech input of the user; receiving a text input of the user; constructing a first instance of a memory data structure based on the speech input; constructing a second instance of the memory data structure based on the text input; adding the first instance and the second instance of the memory data structure to a memory stack of the user; displaying a user interface for retrieving memory data of the user; receiving, via the user interface, a beginning of a statement from the user; retrieving a particular instance of the memory data structure from the memory stack based on the beginning of the statement; and automatically displaying a completion of the statement.

18 Claims, 22 Drawing Sheets

Related U.S. Application Data continuation of application No. 17/185,572, filed on Feb. 25, 2021, now Pat. No. 11,099,813.

(60) Provisional application No. 62/983,464, filed on Feb. 28, 2020.

(56) References Cited

U.S. PATENT DOCUMENTS

| | | |
|---|---|---|
| 11,144,279 B1 | 10/2021 | Kanuganti et al. |
| 11,175,889 B1 | 11/2021 | Kanuganti et al. |
| 2009/0182622 A1 | 7/2009 | Agarwal et al. |
| 2010/0070501 A1 | 3/2010 | Walsh et al. |
| 2012/0166192 A1 | 6/2012 | Yanagihara |
| 2012/0265535 A1 | 10/2012 | Bryant-Rich et al. |
| 2013/0275164 A1 | 10/2013 | Gruber et al. |
| 2014/0079225 A1 | 3/2014 | Jarske et al. |
| 2014/0093860 A1 | 4/2014 | Boneta et al. |
| 2019/0347068 A1 | 11/2019 | Khaitan et al. |
| 2021/0103426 A1 | 4/2021 | Heo |
| 2021/0182020 A1 | 6/2021 | Kanuganti et al. |
| 2021/0349685 A1 | 11/2021 | Kanuganti et al. |
| 2021/0349686 A1 | 11/2021 | Kanuganti et al. |

OTHER PUBLICATIONS

Mahncke et al., (2006). "Memory enhancement in healthy older adults using a brain plasticity-based training program: a randomized, controlled study," Proceedings of the National Academy of Sciences, 103(33):12523-12528.

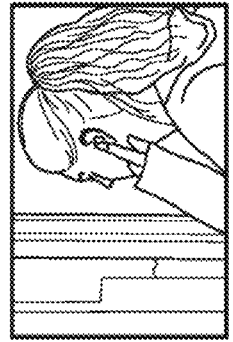

t1

*Erin and her friend Rachel met for dinner on 2/18/2020 at 8pm at Las Havas restaurant.*

Rachel: "We always come here for date night. I actually know the chef, Alan, through fencing club - really nice guy. Last time we came, he somehow found out I love enchiladas del mar and sent it out to me before I event ordered!"

Erin: "Great!"

t2

*The next day, Erin has a conversation with Kirstie about last night's dinner.*

Erin: "She was telling me about a dish she loves ordering off-menu... what was the name of the dish Rachel mentioned last night?"

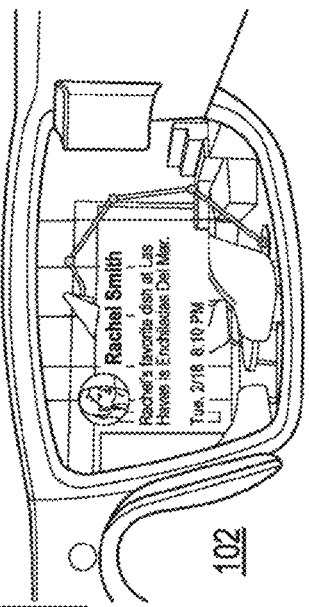

| Memory Data Unit | Audio | GPS | Photos | Social |
|---|---|---|---|---|
| {Text 252 | X | | | |
| Entity 254 | X | | | X |
| People 256 | X | | X | X |
| Date/Time 258 | X | | X | X |
| Location 260 | X | X | X | X |
| Context 262 | X | X | | |
| Emotion 264 | X | | X | X |
| Visual Memory 266 | | X | X | X |
| ... | | | | |
| Owner 268} | X | | X | X |

FIG. 2B

START TYPING TO RECALL WITH YOUR AI
ADD A FRIEND'S AI FOR NEXT LEVEL COLLABORATION

My vision for Human AI is <u>to create a technological version of human memory that is available for the user to recall any information they want to up to 24/7 now 24/7.</u>

+ Add an AI to collaborate          SHIFT to shuffle TAB to accept ENTER to deep recall ○ john.human.ai 2,123 Blocks

FIG. 7C

Science

The demand on human memory is ever increasing with the explosion of information around us. Our cognition - the ability to process, synthesize, and make use of the memories created by us is oriented towards remembering the past, instead of recalling in the present, and prospecting the future. Our experiences encoded in people, facts, thoughts, and emotions influence the actions we take, the decisions we make, and the behavior we exhibit.

1002

● 80% of our memories are forgotten and even less recalled ✓ ✕

Your AI suggests:

We forget 80% of what we say and hear over the course of three days.

MEMORY RETENTION SYSTEM

CROSS-REFERENCE TO RELATED APPLICATIONS

This application is a continuation of U.S. patent application Ser. No. 17/381,046, filed on Jul. 20, 2021, which is a continuation of U.S. patent application Ser. No. 17/185,572, filed on Feb. 25, 2021, now U.S. Pat. No. 11,099,813, issued on Aug. 24, 2021, which claims the benefit of U.S. Provisional Application 62/983,464, filed on Feb. 28, 2020, the entire contents of which are incorporated herein by reference in their entirety.

FIELD OF THE INVENTION

The present disclosure relates generally to a memory retention system, and more specifically to techniques for automatically constructing a searchable electronic version of human memory and for providing a natural retrieval user interface (i.e., a recall user interface).

BACKGROUND

Human memory is the process in which information is encoded, stored, and retrieved in the brain. Human memory, however, can be fickle. A majority of the population has concerns about retention of short-term and/or long-term memory. Thus, there is a need for a memory retention system augmenting human's biological memory and recall functions.

BRIEF SUMMARY

An exemplary computer-implemented method comprises: receiving, via a microphone of an electronic device, a speech input of the user; receiving, via the electronic device, a text input of the user; constructing a first instance of a memory data structure based on the speech input, wherein the first instance comprises a transcript of the speech input and is associated with a first set of context parameters; constructing a second instance of the memory data structure based on the text input, wherein the second instance comprises at least a portion of the text input and is associated with a second set of context parameters; adding the first instance and the second instance of the memory data structure to a memory stack of the user; displaying a user interface for retrieving memory data of the user; receiving, via the user interface, a beginning of a statement from the user; retrieving a particular instance of the memory data structure from the memory stack based on the beginning of the statement; and automatically displaying a completion of the statement based on the retrieved particular instance of the memory data structure.

In some embodiments, the user interface is invoked by a predefined combination of simultaneous key presses.

In some embodiments, the user interface includes a user interface control for adding another user's memory stack.

In some embodiments, the method further comprises: responsive to a user input, displaying the particular instance of the memory data structure in a timeline interface.

In some embodiments, the method further comprises receiving a user input to modify the particular instance of the memory data structure.

In some embodiments, the timeline interface identifies one or more instances of memory data structure that are related to the particular instance.

In some embodiments, the text input comprises an input in a messaging application, an email application, or a collaboration application.

In some embodiments, the method further comprises obtaining the first set of context parameters associated with the speech input.

In some embodiments, the first set of context parameters comprises one or more entities extracted from the speech input.

In some embodiments, the first set of context parameters comprises one or more emotions extracted from the speech input.

In some embodiments, the first set of context parameters comprises a summary of the speech input.

In some embodiments, the first set of context parameters comprises a concept extracted from the speech input.

In some embodiments, the first set of context parameters is obtained from a third-party application.

In some embodiments, the third-party application is a calendar application.

In some embodiments, the memory stack is stored in a blockchain-based database.

In some embodiments, the completion of the statement comprises a time, a person, a location, a concept, or any combination thereof.

The method of claim 1, further comprising: receiving, via the electronic device, an image; constructing a third instance of the memory data structure based on the image; and adding the third instance of the memory data structure to the memory stack.

The method of claim 1, further comprising: receiving data from one or more sensors of the electronic device; constructing a fourth instance of the memory data structure based on the received data; and adding the fourth instance of the memory data structure to the memory stack.

An electronic device comprises: one or more processors; a memory; and one or more programs, wherein the one or more programs are stored in the memory and configured to be executed by the one or more processors, the one or more programs including instructions for: receiving, via a microphone of an electronic device, a speech input of the user; receiving, via the electronic device, a text input of the user; constructing a first instance of a memory data structure based on the speech input, wherein the first instance comprises a transcript of the speech input and is associated with a first set of context parameters; constructing a second instance of the memory data structure based on the text input, wherein the second instance comprises at least a portion of the text input and is associated with a second set of context parameters; adding the first instance and the second instance of the memory data structure to a memory stack of the user; displaying a user interface for retrieving memory data of the user; receiving, via the user interface, a beginning of a statement from the user; retrieving a particular instance of the memory data structure from the memory stack based on the beginning of the statement; and automatically displaying a completion of the statement based on the retrieved particular instance of the memory data structure.

An exemplary non-transitory computer-readable storage medium stores one or more programs, the one or more programs comprising instructions, which when executed by one or more processors of an electronic device having a display, cause the electronic device to: receive, via a microphone of an electronic device, a speech input of the user; receive, via the electronic device, a text input of the user; construct a first instance of a memory data structure based on the speech input, wherein the first instance comprises a transcript of the speech input and is associated with a first set of context parameters; construct a second instance of the memory data structure based on the text input, wherein the second instance comprises at least a portion of the text input and is associated with a second set of context parameters; add the first instance and the second instance of the memory data structure to a memory stack of the user; display a user interface for retrieving memory data of the user; receive, via the user interface, a beginning of a statement from the user; retrieve a particular instance of the memory data structure from the memory stack based on the beginning of the statement; and automatically display a completion of the statement based on the retrieved particular instance of the memory data structure.

An exemplary computer-implemented method for retaining and retrieving a memory of a user comprises: receiving an audio input comprising speech data; deriving, based on the audio input, text, visuals, and/or location data, a plurality of parameters; generating a natural-language text string based on the plurality of parameters; associating the natural-language text string with the plurality of parameters; storing the natural-language text string in a time-series database; receiving a query of the user; retrieving, based on the query, the natural-language text string; and outputting the retrieved natural-language text string.

In some embodiments, a number of words in the natural-language text string is lower than a predefined maximum value.

In some embodiments, the audio input is received via a microphone of a wearable device.

In some embodiments, the query is received via the microphone of the wearable device.

In some embodiments, the plurality of parameters comprise: a time parameter, a location parameter, an entity parameter, a people parameter, a context parameter, an emotion parameter, a visual memory parameter, or any combination thereof.

In some embodiments, the method further comprises receiving a set of GPS coordinates; obtaining a location parameter from the set of GPS coordinates; and associating the natural-language text string with the location parameter.

In some embodiments, the method further comprises receiving an image; obtaining one or more parameters from metadata of the image; and associating the one or more parameter with the natural-language text string.

In some embodiments, the method further comprises receiving social media data of the user; obtaining one or more parameters from the social media data; and associating the one or more parameter with the natural-language text string.

In some embodiments, the method further comprises storing the natural-language text string in a graph-based database.

In some embodiments, the query of the user is a text string.

In some embodiments, the query of the user comprises an audio input and an eye blink from the user.

An exemplary method for retaining and retrieving a memory of a user comprises: at an electronic device having a microphone and an eye movement detection mechanism: detecting, via the eye movement detection mechanism, an eye movement; determining whether the eye movement meets a predefined requirement; if the eye movement meets the predefined requirement, formulating one or more parameters of a query based on an audio input received by the microphone in a predefined time period preceding the detected eye movement.

In some embodiments, the electronic device comprises a pair of glasses.

In some embodiments, the eye movement detection mechanism comprises a plurality of electrodes affixed to the electronic device.

In some embodiments, the eye movement comprises an eye blink.

In some embodiments, the predefined requirement comprises a minimum duration of the eye movement.

An exemplary system for retaining and retrieving a memory of a user, comprises: one or more processors; a memory; and one or more programs, wherein the one or more programs are stored in the memory and configured to be executed by the one or more processors, the one or more programs including instructions for: receiving an audio input comprising speech data; deriving, based on the audio input, a plurality of parameters; generating a natural-language text string based on the plurality of parameters; associating the natural-language text string with the plurality of parameters; storing the natural-language text string in a time-series database; receiving a query of the user; retrieving, based on the query, the natural-language text string; and outputting the retrieved natural-language text string.

An exemplary non-transitory computer-readable storage medium stores one or more programs, the one or more programs comprising instructions, which when executed by one or more processors of a system, cause the system to: receive an audio input comprising speech data; derive, based on the audio input, a plurality of parameters; generate a natural-language text string based on the plurality of parameters; associate the natural-language text string with the plurality of parameters; store the natural-language text string in a time-series database; receive a query of a user; retrieve, based on the query, the natural-language text string; and output the retrieved natural-language text string.

An exemplary electronic device for retaining and retrieving a memory of a user, comprises: a microphone; an eye movement mechanism; one or more processors; a memory; and one or more programs, wherein the one or more programs are stored in the memory and configured to be executed by the one or more processors, the one or more programs including instructions for: detecting, via the eye movement detection mechanism, an eye movement; determining whether the eye movement meets a predefined requirement; if the eye movement meets the predefined requirement, formulating one or more parameters of a query based on an audio input received by the microphone in a predefined time period preceding the detected eye movement.

An exemplary non-transitory computer-readable storage medium stores one or more programs, the one or more programs comprising instructions, which when executed by one or more processors of an electronic device having a microphone and an eye movement mechanism, cause the system to: detect, via the eye movement detection mechanism, an eye movement; determine whether the eye movement meets a predefined requirement; if the eye movement meets the predefined requirement, formulate one or more parameters of a query based on an audio input received by the microphone in a predefined time period preceding the detected eye movement.

BRIEF DESCRIPTION OF THE DRAWINGS

FIG. 1A illustrates exemplary user interfaces of a memory retention system providing memory retention and retrieval, in accordance with some embodiments.

FIG. 2B illustrates parameters in an exemplary memory segment and the sources from which each parameter can be generated, in accordance with some embodiments.

FIG. 7C illustrates an exemplary recall user interface, in accordance with some embodiments.

FIG. 10 illustrates an exemplary recall user interface within an integrated third-party application, in accordance with some embodiments.

DETAILED DESCRIPTION

Figure 1C:
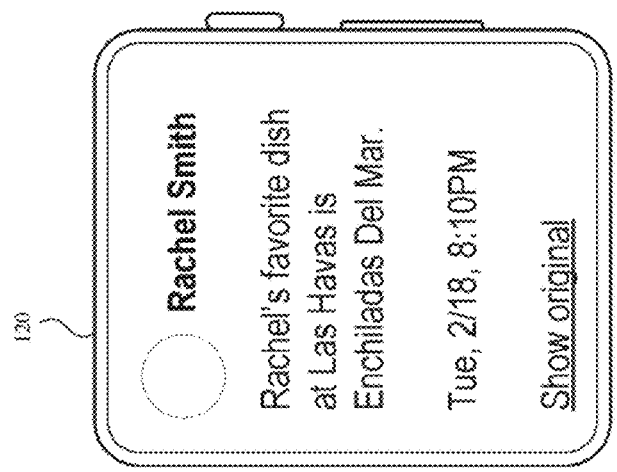
FIG. 1C illustrates an exemplary user interface of a memory retention system providing memory retention and retrieval, in accordance with some embodiments.

The present disclosure is directed to methods, systems, devices, apparatus, and non-transitory storage media for constructing an electronic version of human memory and providing easy retrieval of the memory. Embodiments of the present disclosure can receive memory data (e.g., a continuous stream of audio data) of a user, automatically construct memory segments or data structures that capture rich content and context of the user's life experiences, store the memory segments, and provide user interfaces for easy and natural retrieval of the memory segments. Embodiments of the present disclosure can be deployed via wearable devices, mobile devices, digital assistants, computers, or any combination thereof.

Embodiments of the present disclosure can augment human's biological memory and recall functions. Embodiments of the present disclosure can advantageously facilitate recall of both short-term and long-term memories for a user. Embodiments of the present disclosure can supplement or provide efficient functioning memory for people with high knowledge burden, daily functioning memory for people with performance issues (such as memory loss), and enhanced functioning memory for a human being with average retention.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIGS. 1A-1D illustrates exemplary user interfaces of a memory retention system providing memory retention and retrieval, in accordance with some embodiments. In the example depicted in FIG. 1A, an exemplary user Erin and her friend Rachel met for dinner at Las Havas restaurant at $t_1$ (i.e., 8 pm on Feb. 18, 2020). Aspects of Erin's conversation with Rachel are captured and retained by the system. At $t_2$ (i.e., the next day), Erin has a conversation with Kristie about her dinner with Rachel, and is able to recall aspects of the conversation with the help of the memory retention system via a natural recall user experience. The user interfaces are described below with reference to process 200 (FIG. 2A) and process 300 (FIG. 3A).

Figure 2A:
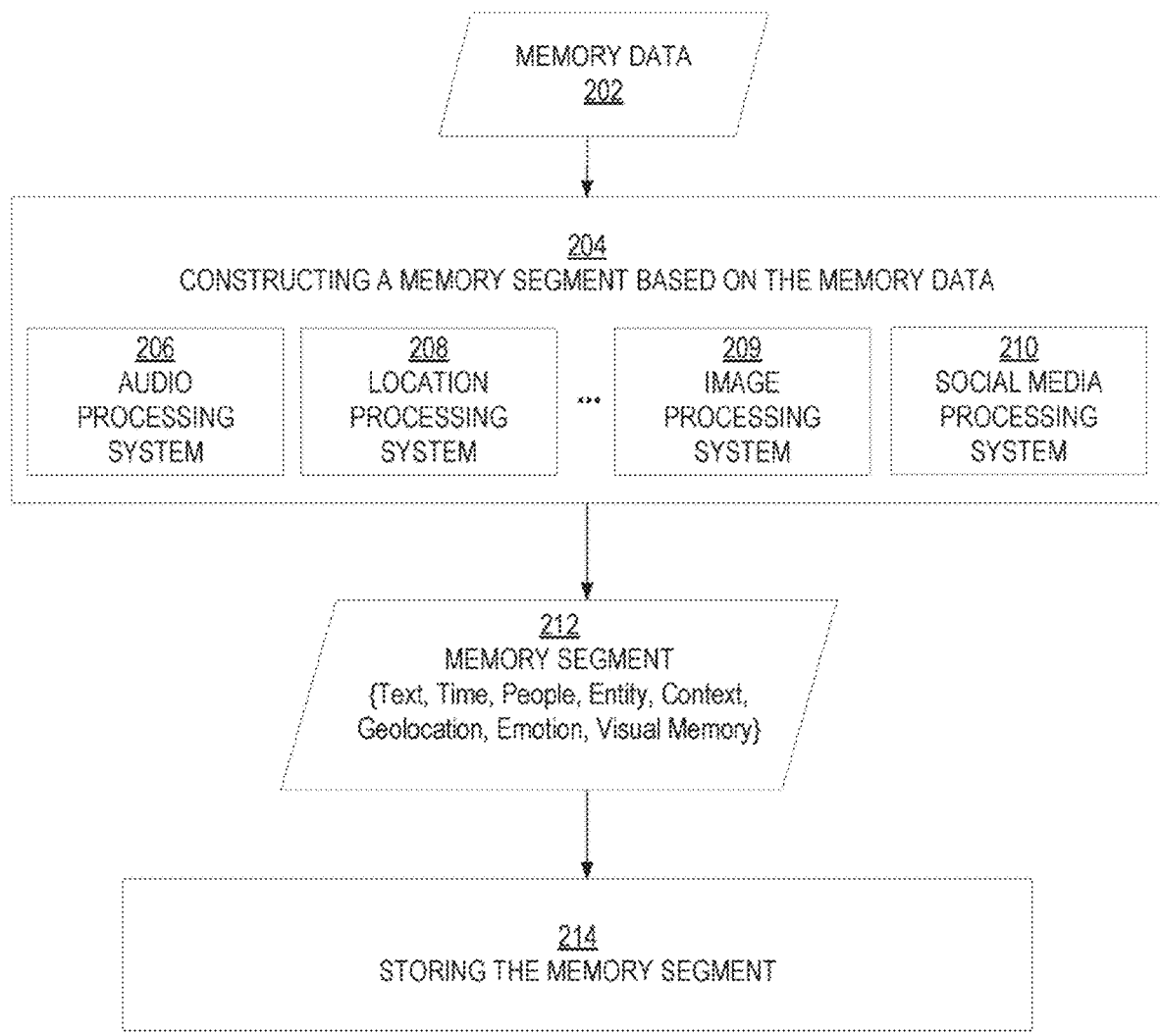
FIG. 2A illustrates an exemplary process for generating a memory segment, in accordance with some embodiments
Figure 3A:
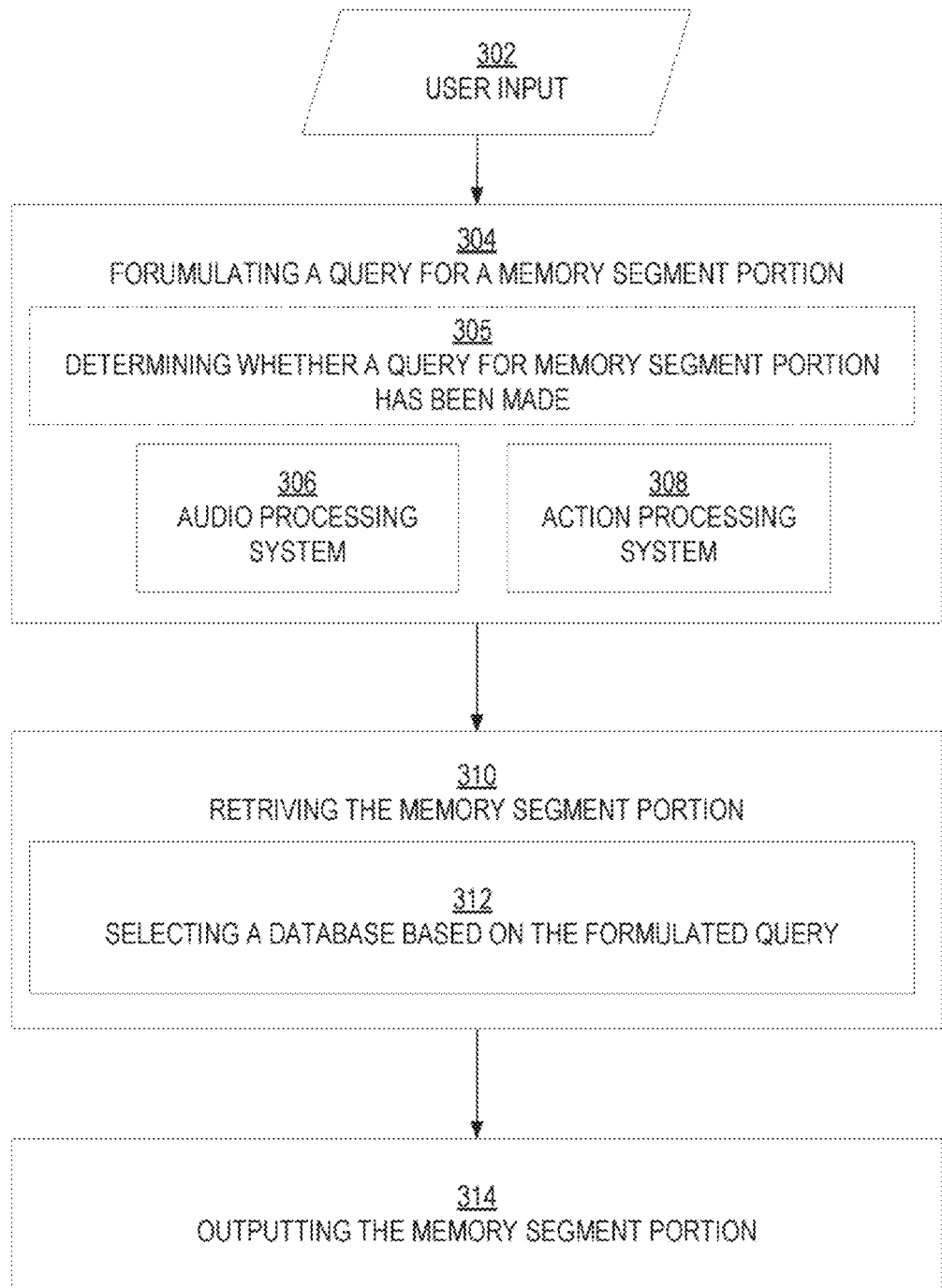
FIG. 3A illustrates an exemplary process 300 for retrieving a memory segment or a memory segment portion, in accordance with some embodiments.

FIG. 2A illustrates an exemplary process 200 for generating a memory segment or data structure, in accordance with some embodiments. Process 200 is performed, for example, using one or more electronic devices implementing a software platform. In some examples, process 200 is performed using a client-server system, and the blocks of process 200 are divided up in any manner between the server and a client device. In other examples, the blocks of process 200 are divided up between the server and multiple client devices. Thus, while portions of process 200 are described herein as being performed by particular devices of a client-server system, it will be appreciated that process 200 is not so limited. In other examples, process 200 is performed using only a client device (e.g., wearable device 102) or only multiple client devices. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

With reference to FIG. 2A, an exemplary system (e.g., one or more electronic devices) receives memory data 202. Memory data 202 includes data that captures life experiences of a user. The memory data can be associated with time information (e.g., time stamps) indicating when the memory data is captured.

In some embodiments, the memory data comprises audio data. The audio data comprises speech audio from the user, speech audio from others, ambient audio, or a combination thereof.

The audio data can be captured by an input device of the system configured to continuously capture audio data. In some embodiments, the input device comprises one or more microphone and can be integrated with a wearable device (e.g., glasses 102).

The one or more microphones can include a bone conduction microphone, a MEMS microphone, or any combination thereof. In some embodiments, the input device comprises multiple microphones for receiving simultaneously multiple audio streams (e.g., corresponding to speech and ambient audio respectively) and allowing for ambient noise cancellation.

In the depicted example in FIG. 1A, at $t_1$, the feed device of the system captures the conversation between Rachel and Erin at $t_1$. The audio data comprises Rachel's speech ("We always come here for date night. I actually know the chef, Alan, through fencing club—really nice guy. Last time we came, he somehow found out I love enchiladas del mar and sent it out to me before I event ordered!"), Erin's speech ("Great!"), and ambient audio. The audio data is associated with one or more time stamps indicating when the audio data is captured.

In some embodiments, the memory data comprises location data (e.g., GPS coordinates) of the user. The location data can be captured by a wearable device (e.g., the user's glasses 102), a mobile device (e.g., the user's mobile phone), or a combination thereof. The location data is associated with one or more time stamps indicating when the location data is captured.

In some embodiments, the memory data comprises image or media data such as photos and videos. The image data can be captured by a wearable device (e.g., the user's glasses 102), a mobile device (e.g., the user's mobile phone), or a combination thereof. The image data can be further obtained from software applications, software services, and/or databases associated with the user. For example, the system can access the user's photos from Google Photos. The image data include metadata such as location and time stamps indicating where and when the image data is captured.

In some embodiments, the memory data comprises social media data. The social media data includes photos, posts, shared content, and contacts of the user. The system can access social media data of the user upon receiving permission and login credentials from the user. The social media data includes metadata such as location and time stamps.

It should be appreciated that the above-described examples of memory data are merely exemplary. Memory data 202 can include any data that captures life experiences of the user. For example, any user-specific information (e.g., the user's calendar, emails, devices, applications, subscribed services) can be part of the memory data 102, as described in detail herein. Further, information derived from the user-specific information (e.g., information of a concert that is in the user's calendar) can be part of the memory data 202.

At block 204, the system constructs a memory segment 212 based on the memory data 202. In some embodiments, the memory segment comprises a plurality of associated, predefined parameters, including a text string, time, people, entity, context, geolocation, emotion, and visual memory. Each of the predefined parameters can be extracted from the memory data 202.

The memory retention system can include an audio processing system 206 for processing the audio data in the memory data 202, as described below.

In some embodiments, the audio processing system 206 comprises one or more speech-to-text algorithms to process audio speech data to obtain a transcription of the speech. In the depicted example in FIG. 1A, the audio processing system can obtain a transcription of Rachel's speech and Erin's speech. The audio processing system can further associate portions of the transcription (e.g., every syllable, every word, every phrase, every sentence) with a time stamp. The speech-to-text algorithms can include open-source algorithms, proprietary algorithms, or any combination thereof.

In some embodiments, the audio processing system 206 comprises one or more speaker diarization algorithms to identify speaker identities associated with the transcription. In the depicted example in FIG. 1A, the audio processing system can identify Rachel's speech as being associated with a first user identity and Erin's speech as being associated with a second identity (e.g., based on the audio characteristics of the speech). In some embodiments, the audio processing system can determine that the second identity is the user of the memory retention system (e.g., based on the audio characteristics of the speech). The speaker diarization algorithms can include open-source algorithms, proprietary algorithms, or any combination thereof.

In some embodiments, the audio processing system 206 comprises natural-language processing techniques for extracting entities. In the depicted example, the audio processing system can extract entities such as "Alan" and "enchiladas del mar" from Rachel's speech. The audio processing system can further classify the entities (e.g., classifying "Alan" as a person, classifying "enchiladas del mar" as food). Exemplary algorithms can include open-source algorithms (e.g., Rasa Open Source, SpaCy), proprietary algorithms, or any combination thereof.

Figure 2C:
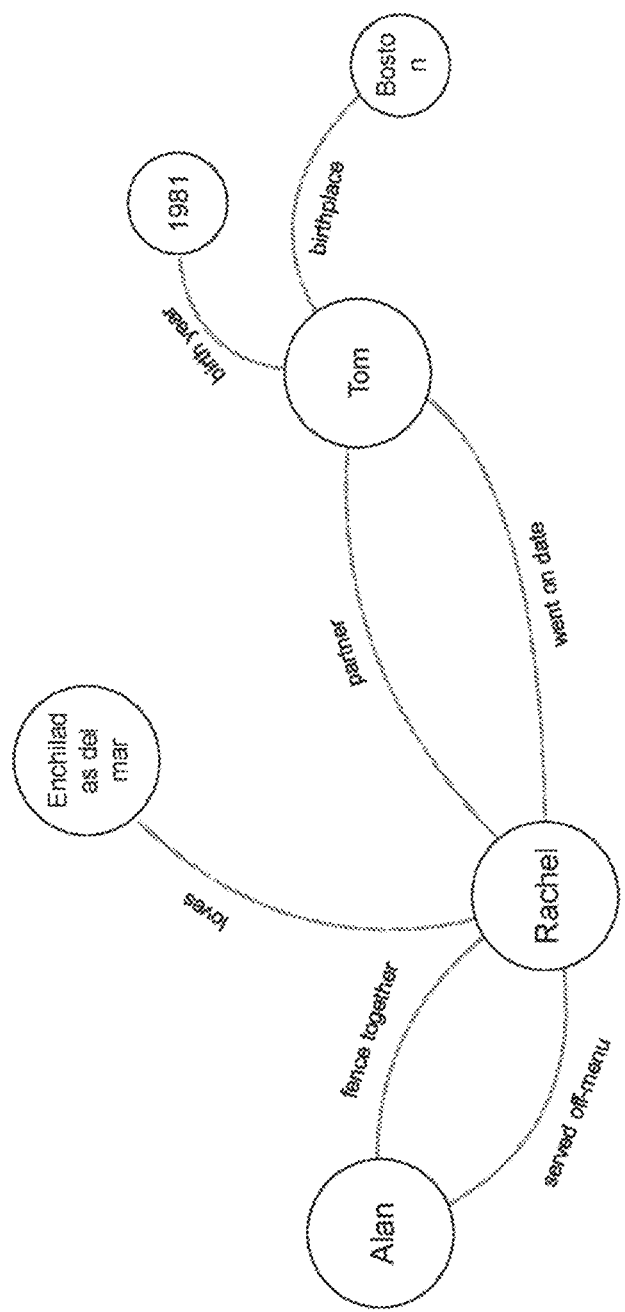
FIG. 2C illustrates an exemplary graph-based database, in accordance with some embodiments.

In some embodiments, the audio processing system 206 comprises entity linking techniques for establishing associations among entities and build a database of the memory retention system. The database can include a plurality of entities (e.g., with unique identifiers) and links among the entities. For example, with reference to FIG. 2C, the database includes an entity "Rachel." In light of Rachel's conversation with Erin, a new person entity "Alan" is added to the database and linked to "Rachel" via two links (i.e., "fence together," "served off-menu"). Further, a new food entity "Enchiladas del mar" is added to the database and linked to "Rachel" via a link (i.e., "loves"). Exemplary algorithms can include open-source algorithms (e.g., SpaCy), proprietary algorithms, or any combination thereof.

As another example, for the following utterance "This is a perfect example of 'The Adjacent Possible theory' by Stuart Kauffman where he suggests at any given moment in history or science, can only make progress in certain prescribed ways. For the independence of blind people, Aira was possible and bionic eyes (or similar) wasn't yet. I am always fascinated by the 'adjacent possibilities' of hard problems," the audio processing system can extract and classify entities such as "The Adjacent Possible Theory" as a work of art, "Stuart Kauffman" as a person, and "Aira" as an organization.

In some embodiments, the audio processing system 206 comprises natural-language processing techniques for determining intent of the speaker. In some embodiments, the audio processing system includes one or more machine-learning models (e.g., neural networks) to determine an intent of the speaker (e.g., based on the transcription such as the verbs, context, history) and identify an action corresponding to the intent. The natural-language processing algorithms can include open-source algorithms (e.g., Rasa Open Source), proprietary algorithms, or any combination thereof.

The audio processing system 206 can generate a number of parameters of the memory segment. FIG. 2B illustrates the parameters in the memory segment and the sources from which each parameter can be generated, in accordance with some embodiments.

With reference to FIG. 2B, the audio processing system can generate a text string 252. In some embodiments, the text string comprises a text string in the natural-language format. In some embodiments, the text string has a predetermined maximum length (e.g., 10 words). In the depicted example in FIG. 1A, the text string can be a text string "Rachel's favorite dish at Las Havas is Enchiladas Del Mar." In some embodiments, the system generates multiple memory segments having multiple natural-language text strings. For example, the system can generate a second memory segment "Alan is the chef of Las Havas." based on the conversation.

The audio processing system can generate one or more entity parameters 254. The entity parameters can be some or all of the entities extracted from the audio data by the audio processing system as described above. In the depicted example in FIG. 1A, the entity parameters can include "enchiladas del mar."

The audio processing system can generate one or more people parameters 256. In some embodiments, the people parameters 256 include identifiers of people present at the conversation (e.g., Erin, Rachel). In some embodiments, the people parameters 256 include identifiers of people mentioned (e.g., Alan) during the conversation. The people parameters can be derived from the outputs of the speaker diarization algorithms and/or the natural-language processing algorithms.

The audio processing system can generate one or more date/time parameters 258. In some embodiments, the date/time parameters 258 include the date and/or time when the conversation is captured. In some embodiments, the date/time parameters 258 include the date/time information mentioned during the conversation. The date/time parameters can be derived from the time stamp(s) associated with the audio data (e.g., time stamp associated with Rachel's speech).

The audio processing system can generate one or more location parameters 260. In some embodiments, the location parameters 260 include the location of the user when the conversation is captured. The location parameters can be derived from audio characteristics of the ambient audio data (e.g., based on known audio signatures associated with different locations). In some embodiments, the location parameters 260 include one or more locations mentioned during the conversation.

The audio processing system can generate one or more context parameters 262. In the embodiments, the context parameters include conversation topics or user intents derived from the audio input based on natural-language processing algorithms. For example, the context parameters 262 can include information related to Erin's previous visits to the restaurant.

The audio processing system can generate one or more emotion parameters 264. The audio processing system can identify emotions associated with a conversation by detecting audio characteristics (e.g., speech rate, tone, pitch, intonation, energy level) in the speech often associated with certain types of emotions. Further, the audio processing system can identify emotions associated with a conversation by detecting keywords (e.g., "happy," "thrilled," "mad") in the speech transcription often associated with certain types of emotions. Further, the audio processing system can identify emotions associated with a conversation by non-verbal cues (e.g., pauses, sighs, coughs, hesitations) in the speech often associated with certain types of emotions.

In some embodiments, the emotion parameters include emotion parameters directed to in-memory emotion/sentiment, emotion parameters directed to reaction/attitude to the memory. In-memory emotion/sentiment comprise emotions extracted by the system at the time of memory creation. In contrast, reaction/attitude comprise attitude toward the memory at any other time (i.e. "liking" a memory or otherwise reacting with emotion, or programmatically extracting attitude toward the memory at any point other than when it is being created, such as worries before an event or positive feelings about an event after the fact).

The audio processing system can generate one or more owner parameters 268. In some embodiments, the owner of a memory segment is the user of the memory retention system (e.g., Erin). In some embodiments, the owner of a memory segment is the speaker of the audio input (e.g., Rachel).

Turning back to FIG. 2A, the memory retention system can include a location processing system 208 for processing location data in the memory data 102. As shown in FIG. 2B, the location processing system 208 can generate one or more location parameters 260 of the memory segment. For example, the memory data 102 can include GPS coordinates of Erin's wearable device (e.g., glasses 102) when Erin met Rachel at the restaurant. Based on the GPS coordinates, the location processing system 108 can identify an address and the associated business entity (e.g., "Las Havas"), which can be included as location parameters 260 in the memory segment.

The location processing system 208 can generate one or more context parameters 262. For example, the system can, based on the location data, derive when Erin previously went to that restaurant, who Erin previously met at that restaurant, and/or other related memories of Erin's at that restaurant. The derived information can be included as context parameters.

The location processing system 208 can generate one or more visual memory parameters 266. For example, based on the GPS coordinates, the location processing system 108 can identify an address and the associated business entity (e.g., "Las Havas"). Based on the address and the business entity, the location processing system can obtain images of the address or the business entity from a third-party database and include the images as visual memory parameters 266 in the memory segment.

Turning back to FIG. 2A, the memory retention system can include an image processing system 209 for processing image data in the memory data 202. As shown in FIG. 2B, the image processing system 209 can generate one or more people parameters 256, date/time parameters 258, location parameters 260, and emotion parameters 264 of the memory segment. For example, the memory data 202 can include a photo taken by Erin's wearable device (e.g., glasses 102) or Erin's mobile device at the restaurant. The image processing system 209 can use facial recognition algorithms to identify people (e.g., Rachel, Erin) and their emotions in the photo. The photo include metadata such a time stamp and a location, which can be included as parameters in the memory segment. Further, the photo and a portion thereof can be included as visual memory parameters in the memory segment.

Turning back to FIG. 2A, the memory retention system can include a social media processing system 210 for processing social media data in the memory data 202. As shown in FIG. 2B, the social media processing system 210 can generate one or more entity parameters 254, people parameters 256, date/time parameters 258, location parameters 260, emotion parameters 264, and visual memory parameters 266 of the memory segment. For example, the memory data 202 can include a post made by Erin (e.g., "Having dinner with @Rachel at @LasHavas restaurant. Thank you @Alan:)") on social media. The social media processing system 210 can thus extract various information such as entities, people, emotions, time, and location from social media posts. In some embodiments, a social media post can include one or more photos and videos, which can be processed by the image processing system 109 to generate additional parameters of the memory segment and included as visual memory parameters.

Because portions of memory data 202 (e.g., audio data, location data, image data, social media data) are associated with time information, the audio processing system 206, the location processing system 208, the image processing system 209, and the social media processing system 210 can generate parameters corresponding to a same time period and group these parameters in a single memory segment. In some embodiments, the memory retention system can de-duplicate and merge parameters generated by the various processing systems.

In the depicted example, a memory segment is generated based on Rachel's utterance. It should be appreciated, however, that a memory segment can be generated based on a part of an utterance, multiple utterances, or a conversation.

Turning back to FIG. 2A, at block 214, the memory retention system stores the memory segment. In some embodiments, the memory retention system comprises multiple databases including a time-series database and a graph-based database (e.g., FIG. 2C). The time-series database allows searching of memory segments by time. In some embodiments, the time-series database includes a plurality of memory segments (or portions thereof) and indexes the plurality of memory segments with time stamps.

The graph-based database allows searching of memory segments by similarity. For example, the memory retention system can add nodes and relationships to the graph-based database as described with reference to FIG. 2C. In some embodiments, the memory segment or a portion thereof (e.g., the text string) is stored in association with the nodes and/or relationships in the graph.

In some embodiments, the memory retention system stores the memory segment using a blockchain-based platform (e.g., Ethereum, Oasis Labs). In some embodiments, each memory segment is stored as a block in a blockchain-based database. Each memory segment can be attached to a non fungible token (NFTs) for memory exchange between users.

The process 200 can be performed on a single device (e.g., a wearable device) or multiple devices (e.g., a client-server system). For example, each of the systems 206-210 can be implemented by one or multiple devices.

FIG. 3A illustrates an exemplary process 300 for retrieving a memory segment or a memory segment portion, in accordance with some embodiments. Process 300 is performed, for example, using one or more electronic devices implementing a software platform. In some examples, process 300 is performed using a client-server system, and the blocks of process 300 are divided up in any manner between the server and a client device. In other examples, the blocks of process 300 are divided up between the server and multiple client devices. Thus, while portions of process 300 are described herein as being performed by particular devices of a client-server system, it will be appreciated that process 300 is not so limited. In other examples, process 300 is performed using only a client device (e.g., wearable device 102) or only multiple client devices. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

With reference to FIG. 3A, an exemplary system (e.g., one or more electronic devices) receives one or more user inputs 302 indicating a query for a memory segment portion. The system can allow a user to submit the query via a plurality of input devices. For example, the system can include a wearable device (e.g., glasses 102) that can receive auditory inputs (e.g., a natural-language utterance such as "what was the name of the dish Rachel mentioned last night"). As another example, the system can include a wearable device (e.g., glasses 102) that can detect facial expressions or gestures as described with reference to FIGS. 4A-C.

As another example, the system can include a software application or service (e.g., a chat bot) that can receive textual inputs (e.g., a natural-language text string such as "Rachel's favorite dish" or "dish Rachel mentioned last night") via an electronic device such as a mobile phone. As yet another example, the system can provide functionalities integrated with a third-party device or service (e.g., a third-party digital assistant) that can receive and process auditory inputs (e.g., "Alexa, what's the dish Rachel mentioned last night?").

At block 304, the system formulates a query for a memory segment portion. For example, if the user input 302 is a natural-language text string (e.g., "dish Rachel mentioned last night"), the system can use one or more natural-language algorithms to determine a user intent (e.g., "search for food item") and search parameters (e.g., "Rachel," "mentioned," "last night").

In some embodiments, at block 305, the system determines whether a query for memory segment portion has been made. For example, a specific sequence and/or combination of user inputs can indicate that a query for memory segment portion has been made. For example, the system can determine that a query for a memory segment portion is made if the user inputs 302 comprises an eye blink exceeding a predefined duration (e.g., 1 second).

Figure 4A:
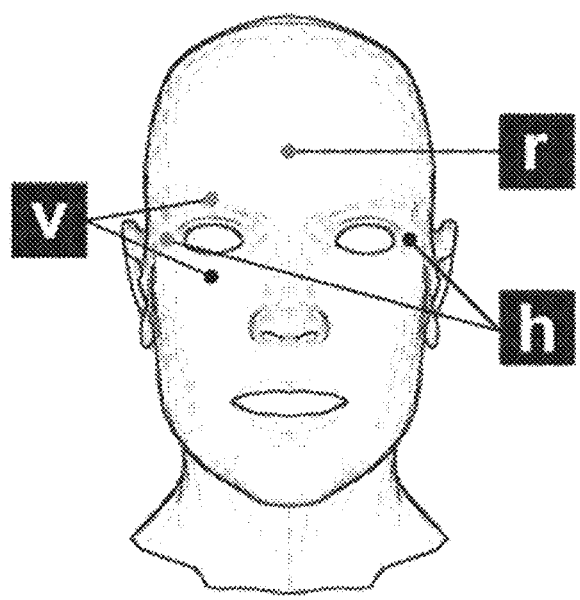
FIG. 4A illustrates exemplary electrooculography techniques of a memory retention system, in accordance with some embodiments.
Figure 4B:
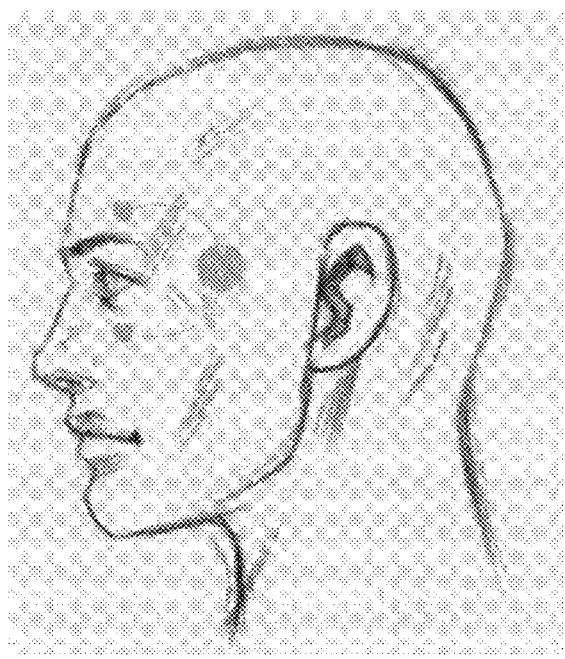
FIG. 4B illustrates exemplary electrooculography techniques of a memory retention system, in accordance with some embodiments.
Figure 4C:
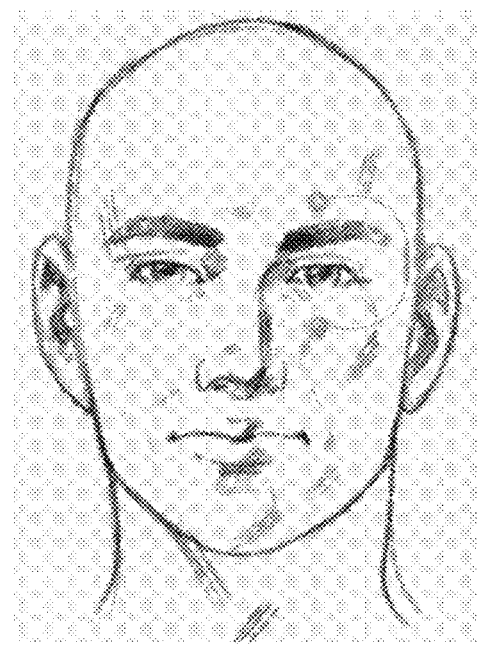
FIG. 4C illustrates exemplary electrooculography techniques of a memory retention system, in accordance with some embodiments.

In some embodiments, the system can comprise an action processing system 308 for processing facial expressions of the user, as described with respect to FIGS. 4A-C. For example, the action processing system 308 determines whether the duration of the eye blink exceeds a predefined duration (e.g., 1 second). In some embodiments, if the eye blink exceeds the predefined duration, the system obtains and processes an audio segment preceding the eye blink (e.g., a 10-second audio segment, a 15-second audio segment) to formulate the query using the audio processing system 306.

In some embodiments, the system continuously or periodically processes an audio segment from (t-10) seconds to t (e.g., t represents the present). If the system detects an eye blink exceeding a predefined duration, the system can complete formulating the query based on an audio segment preceding the eye blink. Because the processing of the audio segment has been initiated before the system detects the eye blink, the time the user needs to wait to retrieve memory data after blinking can be significantly reduced.

In some embodiments, the system can comprise an audio processing system 306 for processing auditory inputs to formulate a query. The audio processing system 306 can be the same as, or share components with, the audio processing system 206 (FIG. 2A). The audio processing system comprises natural-language processing algorithms to determine intent of the user (e.g., searching for a person, searching for a place) and formulate the query (e.g., identifying the search parameters).

In some embodiments, the audio processing system 306 comprises a deterministic intent parser (e.g., regular expressions) and a probabilistic intent parser (e.g., logistic regression). The audio processing system 306 can use the deterministic intent parser and then uses the probabilistic intent parser if the output of the deterministic intent parser does not exceed a confidence threshold.

The deterministic parser relies on regular expressions to match intent and slots. The probabilistic parser relies on machine learning to generalize beyond the set of sentences seen at train time. This parser involves two successive steps: intent classification and slot filling. The intent classification step relies on a logistic regression to identify the intent expressed by the user. For example, for an utterance "Remind me who formulated the adjacent possible theory," the probabilistic intent parser can formulate a structured query such as:
{
  "intent": "search_person",
  "entities": {
    "work_of_art": "adjacent possible theory",
  }}

In some embodiments, the system can determine that a query for a memory segment portion has been made if the user inputs 302 comprises a speech input having a query intent (e.g., "what was the name of the dish Rachel mentioned last night?") even if the speech input is not followed by an eye blink. For example, the system can continuously receive audio data (e.g., from a microphone of a wearable device) and determine the user's intent (e.g., whether the user utterance is directed to the system or to others). The system can determine whether the user utterance is directed to the system, for example, by determining that the user is not engaged with a conversation with others.

At block 310, the system retrieves the memory segment portion based on the formulated query. In some embodiments, at block 312, the system selects a database based on the formulated query. If the query is based on similarity (e.g., "what is Rachel's favorite dish"), the system selects the similarity-based database (e.g., graph-based database). For example, the system identifies, in the graph-based database, the node corresponding to "Rachel," and identifies an associated node corresponding to "favorite food."

If the query is based on time (e.g., "what dish did Rachel mention last night?"), the system selects the time-series database. For example, the system identifies a memory segment that has a time stamp matching "last night" and a people parameter matching "Rachel." The system can then identifies the text string in the memory segment "Rachel's favorite dish as Las Havas is enchiladas del mar."

At block 314, the system outputs the retrieved memory segment portion. In the depicted example in FIG. 1A, the system outputs the retrieved memory segment portion by displaying the text string "Rachel's favorite dish as Las Havas is enchiladas del mar" via glasses 102. In the depicted examples in FIG. 1B, the system can output the entire memory segment on a mobile device 104. As shown, the mobile device 104 displays the text string (referred to as "Membit 106"), as well as the associated date/time parameters 108, location parameter 110, social media parameters 112, emotion parameters 114.

Figure 1D:
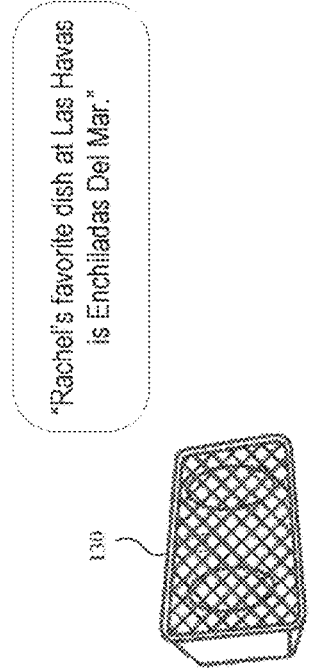
FIG. 1D illustrates an exemplary user interface of a memory retention system providing memory retention and retrieval, in accordance with some embodiments.
Figure 1B:
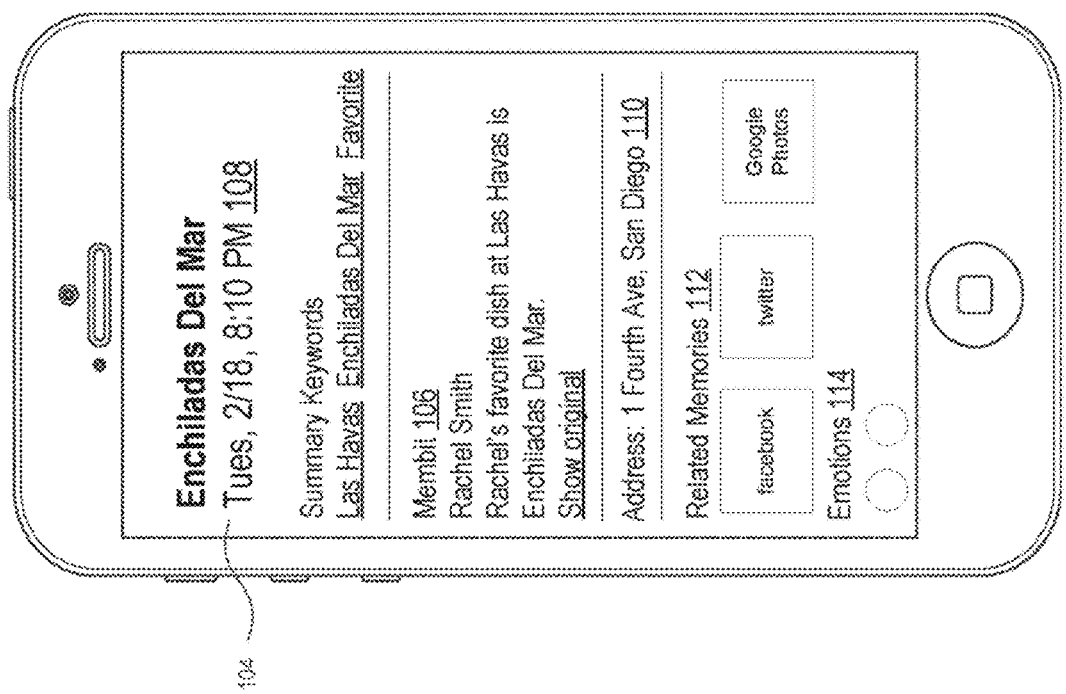
FIG. 1B illustrates an exemplary user interface of a memory retention system providing memory retention and retrieval, in accordance with some embodiments.

As depicted in FIG. 1C, the system can output the retrieved memory segment portion via a notification on a smart watch 120. As depicted in FIG. 1D, the system can output the retrieved memory segment portion via an audio output on a speaker 130. In some embodiments, the speaker 130 includes a built-in third-party digital assistant, which can be integrated with the system to process user queries and retrieve memory segments.

Figure 3B:
FIG. 3B illustrates exemplary user interfaces of a memory retention system providing memory retention and retrieval, in accordance with some embodiments.
Figure 3C:
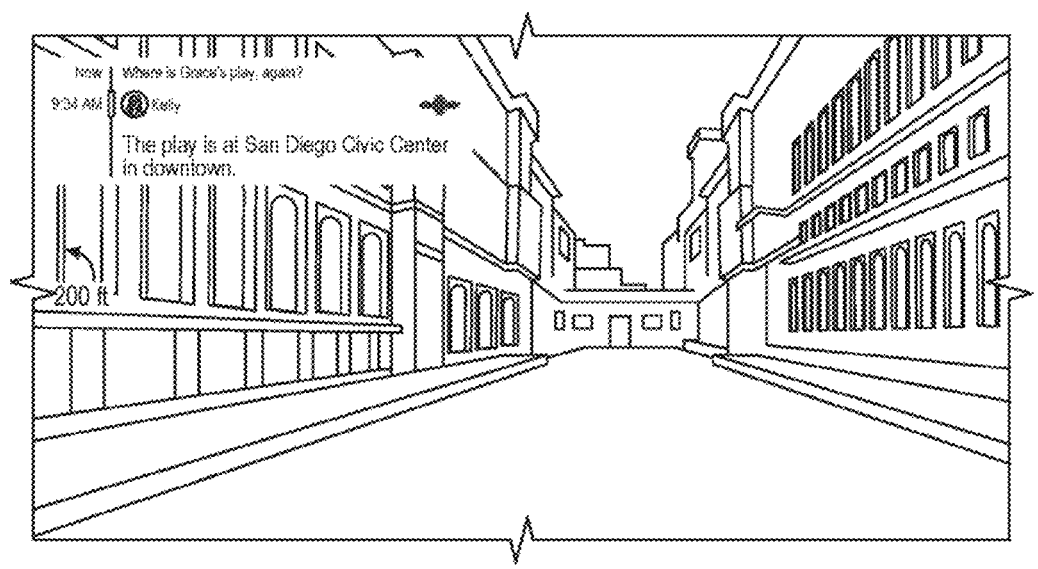
FIG. 3C illustrates exemplary user interfaces of a memory retention system providing memory retention and retrieval, in accordance with some embodiments.

As depicted in FIG. 3B, the glasses can provide a textual output ("The play is at San Diego Civic Center in downtown") and a corresponding audio output in response to an utterance ("Where is Grace's play, again"). As depicted in FIG. 3C, the glasses can automatically derive a second user intent from the utterance (i.e., navigation) in addition to the intent to query the system and perform a follow-up task (e.g., providing navigation information).

Figure 3D:
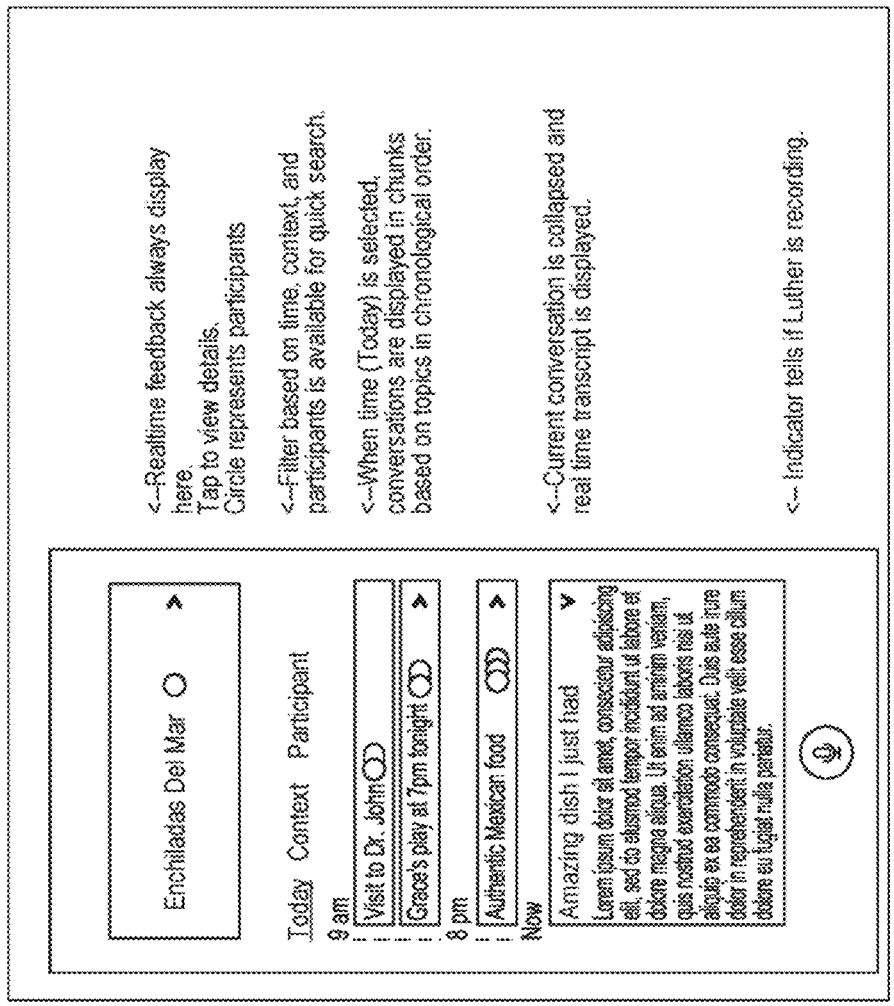
FIG. 3D illustrates exemplary user interfaces of a memory retention system providing memory retention and retrieval, in accordance with some embodiments.

In some embodiments, the memory retention system provides a timeline of a user's memory via one or more user interfaces. FIG. 3D illustrates an exemplary timeline user interface displaying the user's memory segments in a timeline format, in accordance with some embodiments. The timeline user interface can be accessed via one or more electronic devices (e.g., a mobile app, a software application, a software service, a wearable device). In the depicted example, at the "Now" point on the timeline, a transcript of the current conversation is displayed. At the top of the user interface, the most recent or the current memory segment formulated can be indicated.

FIGS. 4A-C illustrate exemplary electrooculography techniques of a memory retention system, in accordance with some embodiments. Electrooculography refers to measurement of the electrical potential between electrodes placed at points close to the eye to detect eye movements. A human eye can be modeled as a dipole with its positive pole at the cornea and its negative pole at the retina. Assuming a stable corneo-retinal potential difference, the eye is the origin of a steady electric potential field. The electrical signal that can be measured from this field is the electrooculogram ("EOG"). EOG is used to detect eye movements, including blinks, fixations (i.e., eye's stationary state during which gaze is held), saccades (i.e., constant eye movement building a mental map of a scene). Other movements (e.g., repetitive movement due to reading) can be detected using a combination of the three mentioned. Electrooculography generally is less computationally intensive and requires less power than tracking eye movement using high-resolution cameras.

With reference to FIG. 4A, five electrodes can be positioned to detect electrical signals due to eye movements: a pair of vertical (V), Horizontal (H) electrodes and a reference (R) electrode. These electrodes can be affixed to a wearable device (e.g., glasses 102) to maintain their relative positions. The complexity of the electrode architecture may depend on number and type of eye movements that are needed to be detected.

For detecting blinks only, H electrodes may be eliminated in some embodiments. As shown in FIGS. 4B-C, the circuits and Reference (R) electrode are on the side and the Vertical (V) electrodes are above and below the eye.

In some embodiments, the audio inputs received by the memory retention system can be transmitted to a server device for processing. The voice transmission can be performed via VoLTE or Over the Top (OTT) VoIP, in some embodiments.

Figure 6A:
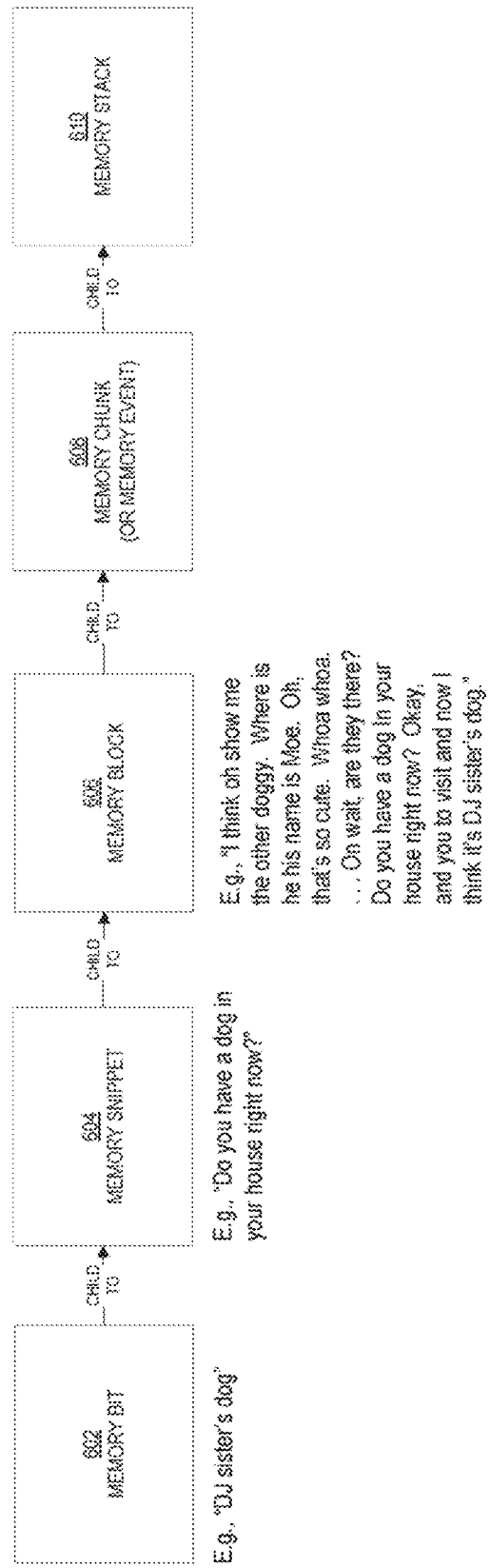
FIG. 6A illustrates exemplary data structures for storing memory data, in accordance with some embodiments.

FIG. 6A illustrates exemplary data structures for storing memory data, in accordance with some embodiments. The memory retention system supports a plurality of types of data structures: memory bit 602, memory snippet 604, memory block (or memory event) 606, memory chunk 608, and memory stack 610. In some embodiments, each user of the memory retention system is associated with his or her own memory stack 610.

A memory bit can refer to a basic information unit such as a location, a person, a time, etc. A memory snippet can refer to an utterance such as an audio sentence or a textual sentence (e.g., a single Slack message). A memory block can refer to a plurality of consecutive utterances from the same person (e.g., an email) or multiple people. A memory chunk can refer to a grouping of utterances that involve multiple people. A memory chunk or memory event can refer to a single conversation, an event (e.g., calendar event), one voice event, one email thread, etc.

The data structures can be configured to store content data (e.g., emails, tweets, audio transcriptions), and context data (e.g., context parameters, which includes metadata (e.g., people, time, location, source) and generated data (e.g., emotions, summaries) as described herein. All of the memory data structures described herein can be stored in a blockchain-based database.

The various data structures are in parent-child relationships. For example, a memory bit is child to a parent memory snippet; a memory snippet is child to a parent memory block; a memory block is child to a parent memory chunk. For example, in the exemplary data segment in FIG. 2B, the audio utterance can be stored as a memory snippet, while the parameters can be stored as children memory bits to the memory snippet.

Each type of data structures 602-610 can include metadata and generated data in addition to content data (e.g., text, audio, image, video). For example, a memory block can include content data (e.g., transcript of utterances), metadata (e.g., location where the utterances are spoken, the speaker) and generated data (e.g., an emotion associated with the utterances). As another example, a memory chunk can include, as generated data, a summary of all of the utterances in the child memory blocks.

Figure 6B:
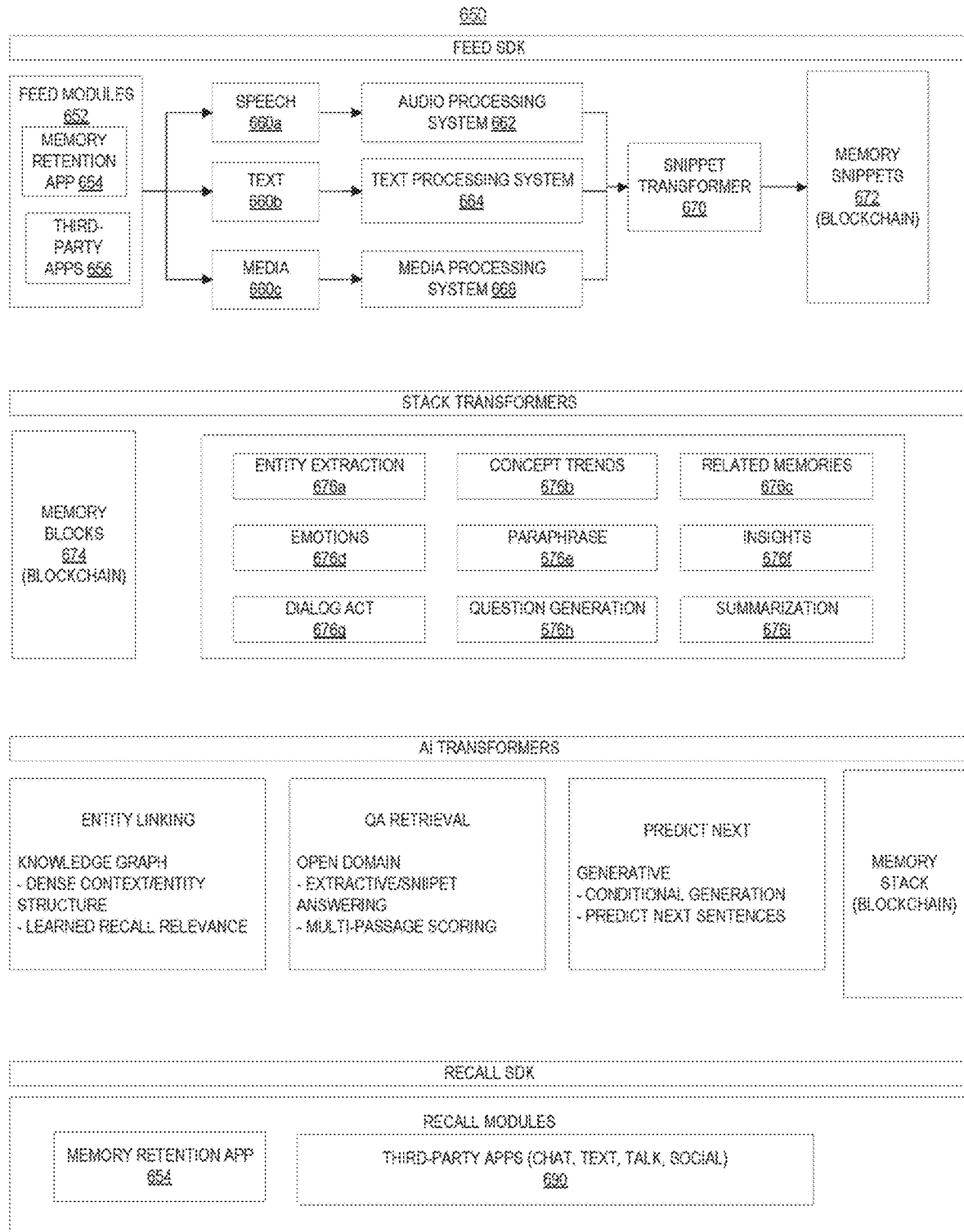
FIG. 6B illustrates an exemplary memory retention system for generating memory data structures and retrieving memory data structures, in accordance with some embodiments.

FIG. 6B illustrates an exemplary memory retention system 650 for generating memory data structures and retrieving memory data structures, in accordance with some embodiments. The memory retention system 650 can be used to perform the method of FIG. 2A.

With reference to FIG. 6B, the memory retention system comprises a plurality of feed modules 652 for receiving memory feed data (e.g., memory data 202). The feed modules can include a memory retention application 654 and one or more third-party applications 656. The memory retention application 654 can include a standalone application or a component (e.g., plug-in) of another application. The memory retention application can operate on any type of electronic devices, such as mobile devices, laptop devices, audio devices, vehicles, and wearable devices (e.g., devices in FIG. 1B). As shown in FIG. 6B, the memory retention application can be configured to receive speech data 660a, text data 660b, and media data 660c.

The third-party applications 656 can comprise any type of software applications that receive user data, including conferencing applications (e.g., WebEx, Teams, Zoom), social media applications (e.g., Twitter, Facebook, Instagram), media applications (e.g., YouTube, Google Photos), collaboration applications (e.g., Slack), productivity applications (e.g., Google Calendar, Outlook), etc. These applications can be integrated into the memory retention system to provide speech data 660a, text data 660b, and media data 660c.

The speech data 660a (e.g., utterances during a Zoom call) can be processed by an audio processing system 662 (e.g., audio processing system 206). As discussed above (e.g., FIG. 2B), the audio processing system processes the speech data to obtain content and context data. For example, the audio processing system can comprise speech recognition algorithms to obtain a text transcription from the speech data 660 (i.e., content data). In some embodiments, user-specific speech recognition models can be used to enhance speech recognition. The audio processing system can further comprise speaker diarization algorithms to assign speaker IDs to various portions of the text transcription. In some embodiments, the text transcription is further processed by the text processing system 664 to segment the transcription into a plurality of segments (e.g., sentences).

The text data 660*b* (e.g., emails, text messages) can be processed by a text processing system 664. As discussed above (e.g., FIG. 2B), the text processing system 664 can process the text data to obtain content and context data. For example, the text processing system can perform text segmentation to segment the text data 660*b* into a plurality of segments (e.g., sentences). Further, speaker IDs can be assigned to the segments based on the metadata associated with the text data (e.g., author of the message or email).

The media data 660*c* includes image and video data and can be processed by a media processing system 668 (e.g., image processing system 209). As discussed above (e.g., FIG. 2B), the media processing system can process the media data to obtain content and context data. For example, the media processing system can recognize objects and entities in the media data.

With reference to FIG. 6B, a snippet transformer 670 generates a plurality of memory snippets. A memory snippet can include a single-sentence utterance (e.g., "Do you have a dog in your house right now?") or a single text message (e.g., "My vision for Luther AI is to create a technological version of human memory that is available for the user to recall any information they want"). A memory snippet can have child memory bits (e.g., entity, time, location) that can be generated based on the memory data as described herein.

Further, the memory retention system can generate memory blocks 674 based on the memory snippets 672. A memory block can refer to a plurality of consecutive utterances from the same person (e.g., an email, a monologue). A memory block can have a plurality of child memory snippets. For example, a memory block can be generated based on a Twitter thread, with tweets from a person stored as child memory snippets of the memory block. Metadata (e.g., time, people, location) can be derived from the third-party platforms (e.g., Twitter, Gmail) and associated with the memory block and/or child memory snippets.

Further, the memory retention system can generate memory chunks based on memory blocks. For example, the system can automatically group memory blocks 674 into the same memory chunk or memory event. This grouping can be made if the utterances are close to each other in time, if the utterances are associated with the same location, and/or if the utterances are associated with the same calendar event.

For example, from a calendar meeting in a user's calendar, a memory event can be generated. Metadata associated with the calendar meeting (e.g., time, duration, location, people, source) can be derived from the calendar application and associated with the generated memory event. Further, audio utterances obtained during the time of the meeting by the memory retention system can be stored as child memory blocks and memory snippets. As another example, a memory chuck can be generated based on an email thread, with each email stored as a child memory block.

With reference to FIG. 6B, a plurality of transformers can be used to augment the memory data structures (e.g., snippets, blocks, chunks). The outputs of the transformers can be stored as new memory data structures (e.g., synthetic data structures) or as generated data associated with existing memory data structures. The Stack transformers includes artificial intelligence ("AI") models that extract and predict attributes to enrich raw memory blocks-applied to the user's memory stack at runtime when the user takes the action to feed. The Recall transformers includes AI models that retrieve and generate answers from relevant memory data-retrieved from the users' memory stack at runtime when the user takes the action to recall.

In some embodiments, the transformers include a transformer 676*a* for extracting entities. As described above, the transformer can process an utterance (e.g., "Do you have a dog in your house right now") in a memory snippet to identify one or more entities (e.g., "DJ sister's dog"). The extracted entities can be stored as child memory bits of the memory snippet.

In some embodiments, the transformers include a transformer 676*b* for identifying concept trends. From the extracted entities from each of the memory blocks, the system can compute the concept trends by identifying the most significant terms based on context—recency (time), event (current), and people (context) and surface the top concepts that are most relevant (e.g., most recent, most frequent, most discussed with a particular person).

In some embodiments, the transformers include a transformer 676*c* for identifying related memories. Related memories are generated from multiple sources. Related memories are represented as memory blocks that are related: the related-ness between memory blocks is determined based on a measure of similarity between the context (e.g. metadata and generated data) computed from graph nodes and based on a measure of similarity between the content (e.g. text, image, audio) computed from raw and transformed data.

In some embodiments, the transformers include a transformer 676*d* for identifying emotions. For example, the transformer can identify emotions by detecting audio characteristics in the speech, keywords and punctuations, and non-verbal cues, as described herein.

In some embodiments, the transformers include a transformer 676*e* for paraphrasing. The paraphrasing transformer creates a grammar and semantic corrected version of the memory block. Language models are applied to both transcribed text and the written text without modifying the original meaning.

In some embodiments, the transformers include a transformer 676*f* for identifying insights. The insight transformer serves user analytics and trends (e.g. numeric or qualitative) on metadata and transformer predicted/generated values. Examples include the majority of the emotion last week, the number of facts identified, etc.

In some embodiments, the transformers include a transformer 676*g* for identifying dialog act. The dialog act transformer identifies the function of the sentence such as greetings, questions, statements, facts, opinions, acceptance. This is based on categorizing the type of the sentences in a conversational setting.

In some embodiments, the transformers include a transformer 676*h* for question generation. The question generation transformer generates question answer pairs given the context of a memory block or memory snippet. The question generation identifies the facts in the memory block and the question context based on the fact the user can recall later.

In some embodiments, the transformers include a transformer 676*i* for providing summarization. The summarization transformer is based on generation both extractive and abstractive summary based on both the individual memory data structures and multiple memory data structures. For example, an extractive summary of a memory block is one or two sentences that contains the most relevant concepts for the user. An abstractive summary of multiple memory blocks contain generated sentences for multiple relevant concepts for the user.

With reference to FIG. 6B, the memory retention system further comprises a plurality of recall transformers. The entity linking transformer is a context based recall transformer based on metadata and transformed values (e.g. memory bits) by internally linking to other memory blocks that share similar values or externally linking to other content (e.g. Wikipedia) by similar values. The QA retrieval transformer is a fact based recall transformer based on open domain question answering by extracting the answer to a factual question given a context of one or more memory blocks. The generative transformer (predict next) is a generative based retrieval transformer based on generating possible answers given a context of a few words or sentences, auto completing a single or multiple sentences. The recall transformers can be invoked within the memory retention app 654 and within third-party platforms (e.g., Twitter). Further, it can be invoked to process query terms as they are provided in real time (e.g., as the user inputs a query in the user interface 700) or process existing query terms (e.g., to process text in an existing Google Docs document).

The memory data structures allow full-text and full-element searches across different levels. In some embodiments, the memory data structure can be in a graph model, with context data (metadata and generated data) as memory nodes and the memory data structure (e.g., memory blocks) as memory edges. For example, nodes can be "Suman", "February 2020", "patent application" with edges between them as "I was working on a patent application for Luther Labs" with timestamp 20200228 and "I am working on a patent application for Human AI Labs" with timestamp 20210224. The temporal information kept on the edges enables the system to create a time series representation of all the historical memory blocks between two memory nodes and the node representation in the embedding space leverages both the time information and the free text information on the edges.

Any of the transformers described herein can include an AI or machine-learning model to improve its performance over time. The model can be trained based on the user's memory stack, bootstrapped data, or any combination thereof. In some embodiments, the transformers can generate synthesized memory data structures. These memory structures can be generated using one or more user-specific models (e.g., GPT style language model).

For example, the system can generate a model about a specific person (e.g., based on history of all communications with that person) to answer recall queries regarding the person (e.g., "How many times have I met Rachel"). As another example, the system can generate a model about a specific time (e.g., based on an event, a week, a day) to answer recall queries regarding the time (e.g., "What did I do last week?" "When was the last time I attend this conference?") In other words, the system can generate a model about a specific context (e.g., based on a single concept) to answer recall queries regarding the context (e.g., "My tweets about my vision for this company").

In some embodiments, the models are trained to conform to the user's specific style for writing text and/or speaking (e.g., providing outputs based on the user's specific style). For example, the model generates different styles of the same semantic content in the short form of Twitter (e.g. "My vision for Luther is to create a technology version of human memory. #vision #ai) and E-mail (e.g. "A little about our company: our vision for Luther is to create a technological version of memory to augment the human biological capacity."). These models can be either unsupervised models or supervised models. In some embodiments, supervised modeling is restricted to the use cases that does not introduce bias—such as question answering.

In some embodiments, user feedback (implicit and explicit) can be used to measure model efficacies and train/improve the models. In some embodiments, the user can explicitly provide memory data to the system to retain. For example, the user can speak to the system (e.g., "from 1-2 pm I talked to Will about Documentation") to create new memory data structures or provide metadata about existing memory structures. The user can add a list of related general topics that the system can model to automatically tag other memory blocks on a similar topic. The content of each memory block is compared and classified against available knowledge sources and common topics that occur in them. (e.g. Wikipedia)

In some embodiments, the user can edit or add tags into the system (e.g., via user interface 800). The tags are in turn incorporated into the corresponding memory data structures, the speech recognition models, transformer models, and/or the user graph (as memory nodes, memory edges, etc.). The user can correct transformer outputs, such as emotions, dialog act, speaker, and other information that may be used for recall and training purposes. In some embodiments, through user actions (e.g. accept, shuffle) on the recall user interfaces (e.g., user interface 700), the system can construct or update user graphs from the recalling behavior and dynamically adjust to predict what the user may want to know. (e.g. what is likely to be recalled together).

With reference to FIG. 6B, the memory retention system comprises a plurality of recall modules. The recall modules can include the memory retention app 654. Exemplary user interfaces of the memory retention app are described herein with respect to FIGS. 1A, 1B, 3B-D, 7A-C, and 8A-C. The recall modules can include third-party applications, including conferencing applications (e.g., Slack, Teams), text applications (e.g., SMS, Whatsapp), virtual assistants (e.g., Alexa, Siri), and social media applications (e.g., LinkedIn, Twitter). The third-party applications can provide recall functionalities using native user interfaces. For example, a user may ask Siri "Hey Siri, what was the name of the dish Rachel mentioned last night?" As another example, a user may enter a query for memory in the search bar of Slack. In some embodiments, entry points to the memory retention application 654 can be provided in the third-party applications. Exemplary user interfaces are described herein with reference to FIGS. 9 and 10.

Figure 7A:
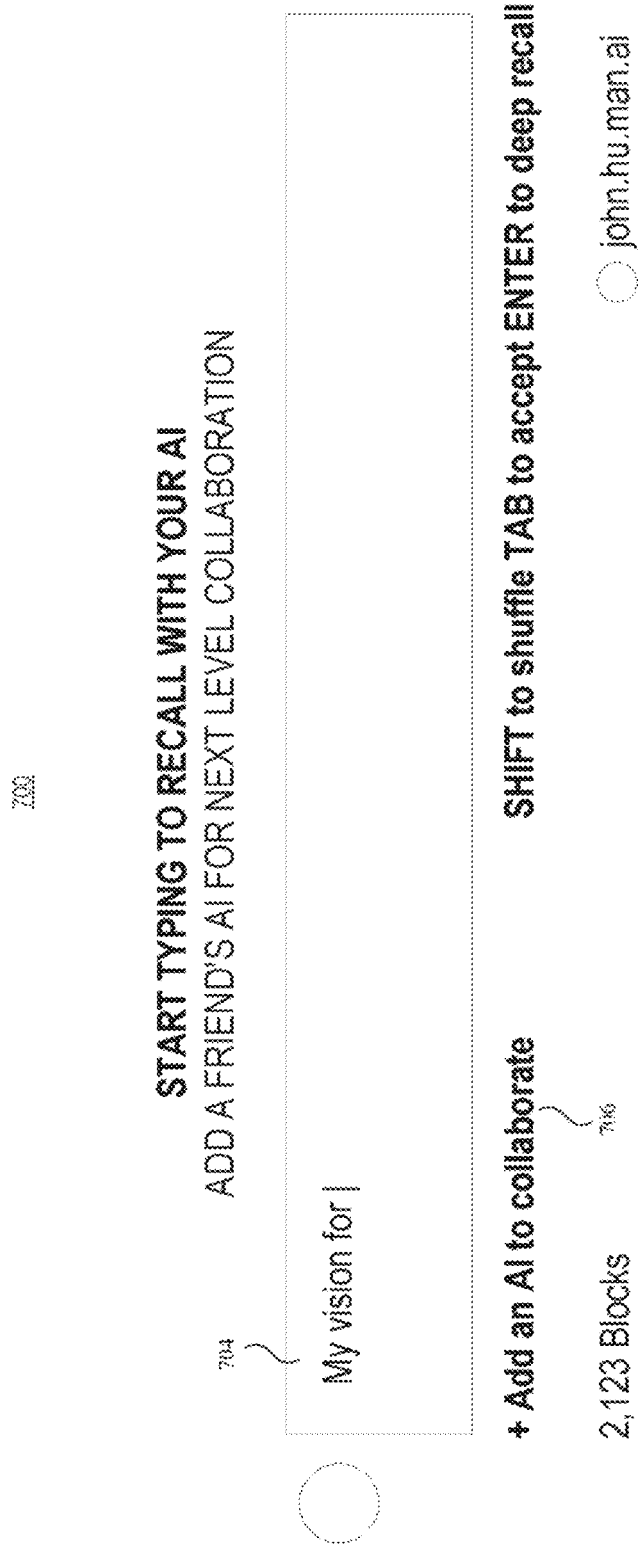
FIG. 7A illustrates an exemplary recall user interface, in accordance with some embodiments.
Figure 7B:
FIG. 7B illustrates an exemplary recall user interface, in accordance with some embodiments.

FIGS. 7A-C illustrate exemplary user interfaces of a memory retention system, in accordance with some embodiments. The memory retention system provides user interfaces that are easily accessed and operated, providing a seamless and intuitive experience that does not require much training, explanation of documentation.

In some embodiments, the user interfaces in FIGS. 7A-C can be invoked within a memory retention application (e.g., memory retention application 654) implemented on an electronic device (e.g., mobile devices, audio devices, vehicles, wearable devices, computers). In some embodiments, the user interfaces can be invoked within third-party applications (e.g., third-party applications 690) or within an operating system.

In some embodiments, the user interfaces can be invoked using a universal hotkey (e.g., command+R). Responsive to receiving activation of the hot key, the user interface 700 is displayed for recalling memory data. When invoked, the user interface 700 may include previous results, which disappear as soon as the user starts speaking or typing. In some embodiments, the user can press a predefined key (e.g., <ESCAPE>) to dismiss the user interface 700.

With reference to FIG. 7A, the user interface 700 comprises a text box 704 for entering a recall query. The user can enter the recall query by typing into the text box or providing an audio input. The query can be formulated as either a statement ("My vision is") or a question ("What's Rachel's favorite restaurant?").

With reference to FIG. 7B, as the user enters the recall query, one or more auto-complete options (e.g., for people, location, time, concepts) are provided. For example, the system provides the one or more auto-complete options once the confidence measure for the prediction exceeds a predefined threshold. The options can include additional query terms. In the depicted example, in response to the user input "My vision for," the system provides a plurality of options: "Human Ai," "Aka," and "Privacy." The user can scroll through the options by pressing a first predefined key (e.g., <SHIFT>) and select an option by pressing a second predefined key (e.g., <TAB>).

In some embodiments, the ranking of these options can be dependent on their relative relevance, user-specific preferences and history (e.g., user favorited, recently searched, recently tagged), and/or top-of-mind people/topic (e.g. next events in calendar, significant concept tags).

The list auto-complete options can be updated as the user provides more terms to complete the query. With reference to FIG. 7C, after the user selects "Human Ai," the system can display a new auto-complete option. The user can press a third predefined key (e.g., <ENTER>) to display the specific memory data structure (e.g., memory snippet, memory block) within his or her memory stack. Exemplary user interfaces for such deep recall are described below with reference to FIGS. 8A-C.

In some embodiments, when the user interface 700 is invoked, the text box 704 can provide one or more auto-complete options before any user input is provided, such as: "Does," "What," "Why," "How," "I met with," "I wrote to," "I asked," "I felt," "the time/person/place/reason/thing/amount/feeling/thought/concept/topic that," etc. In some embodiments, if there is existing context in the buffer (e.g., the user has spoken before activation of the recall user interface), the existing context forms the beginning of the query.

Figure 8A:
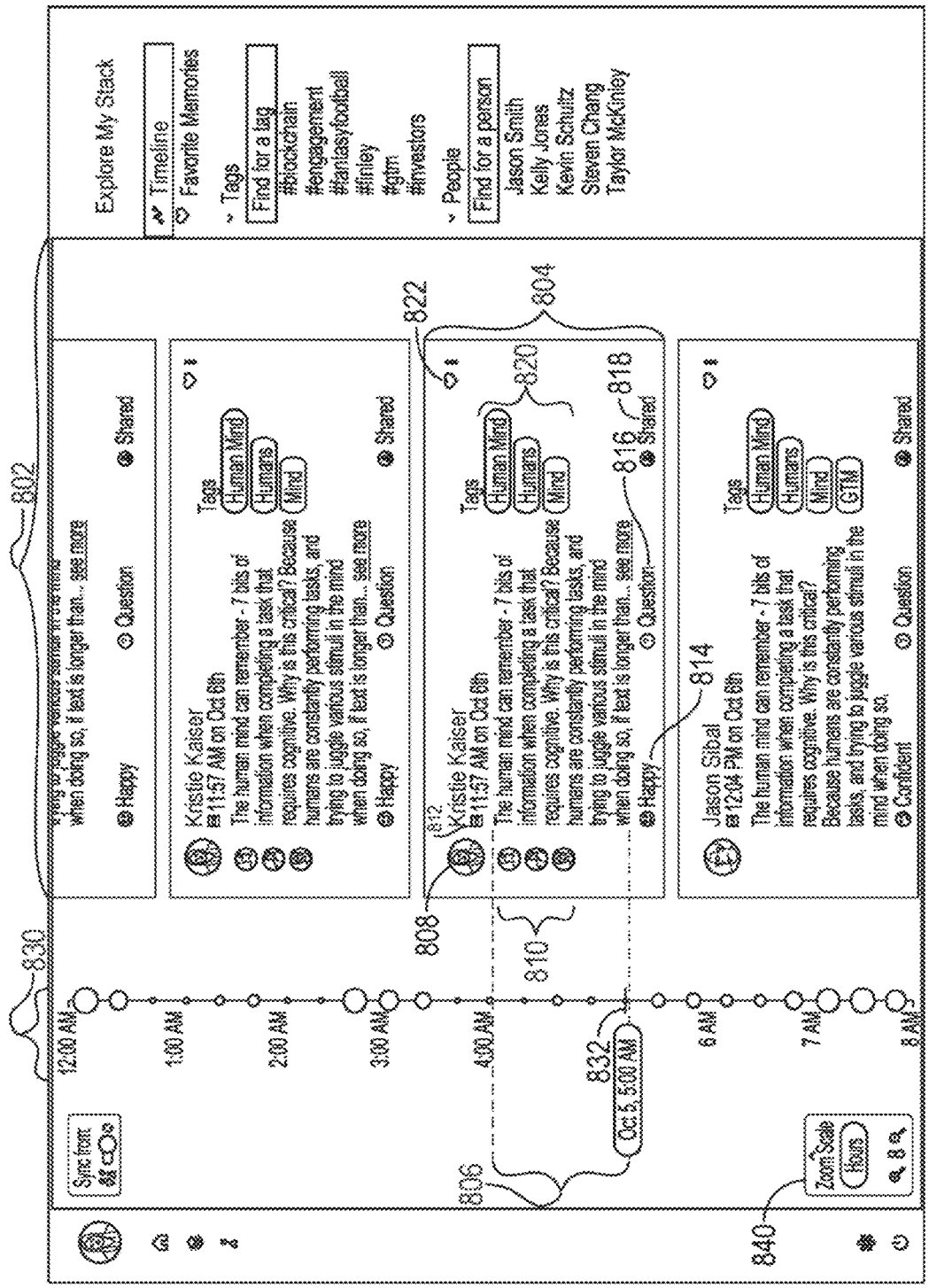
FIG. 8A illustrates an exemplary user interface of the memory retention system, in accordance with some embodiments.

In some embodiments, the user interface 700 provides entry points for obtaining additional information and/or invoking additional user interfaces, such as the last memory block recalled, the timeline user interface in FIG. 8A, a recent recall query, the last topic discussed, the last question asked, the last thing the memory retention system learned (e.g., "Rachel's dog is called Moe"), Favorite Memory, etc. Some or all of the information or user interfaces may be invoked using hotkeys (e.g., command+a predefined key).

Figure 7D:
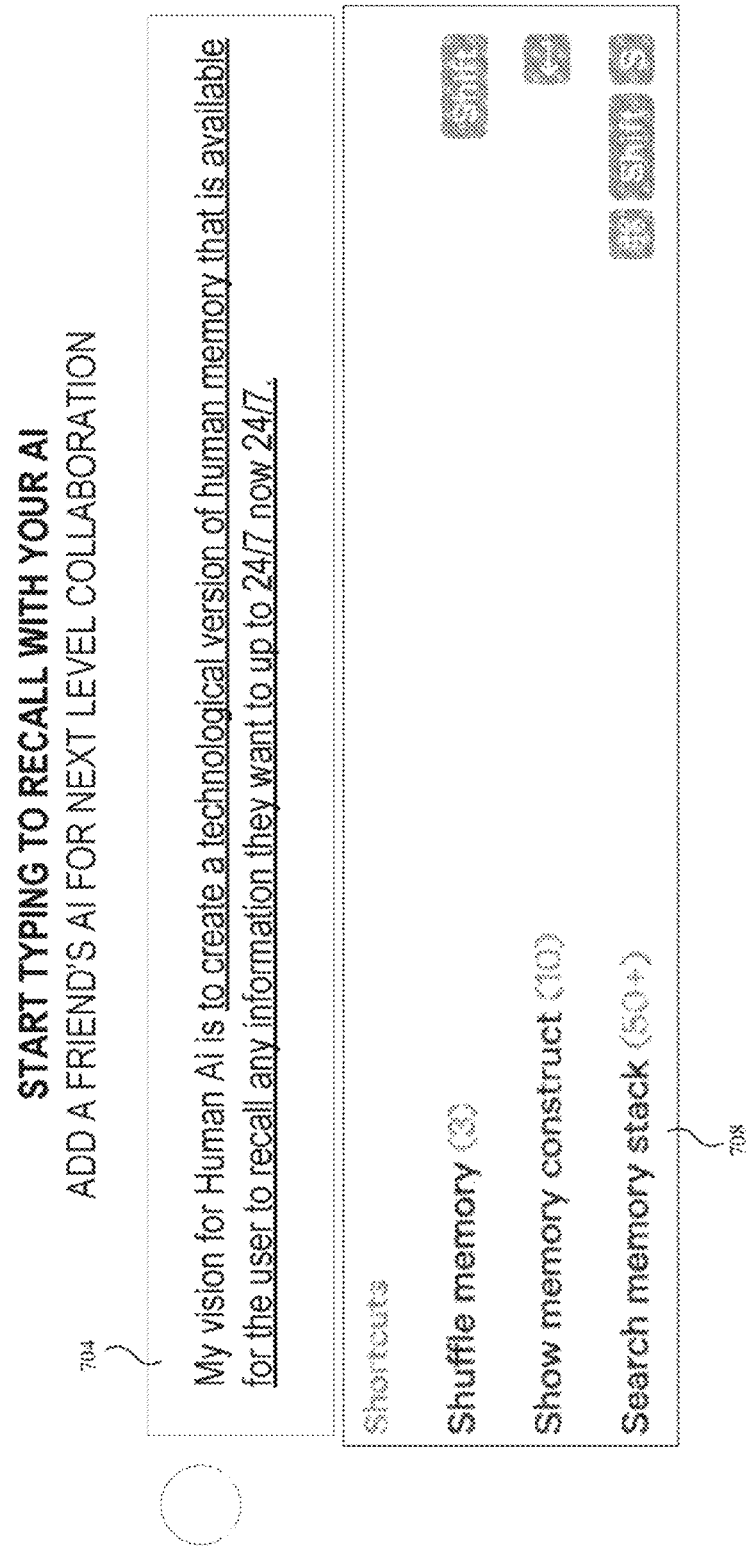
FIG. 7D illustrates an exemplary recall user interface, in accordance with some embodiments.
Figure 7E:
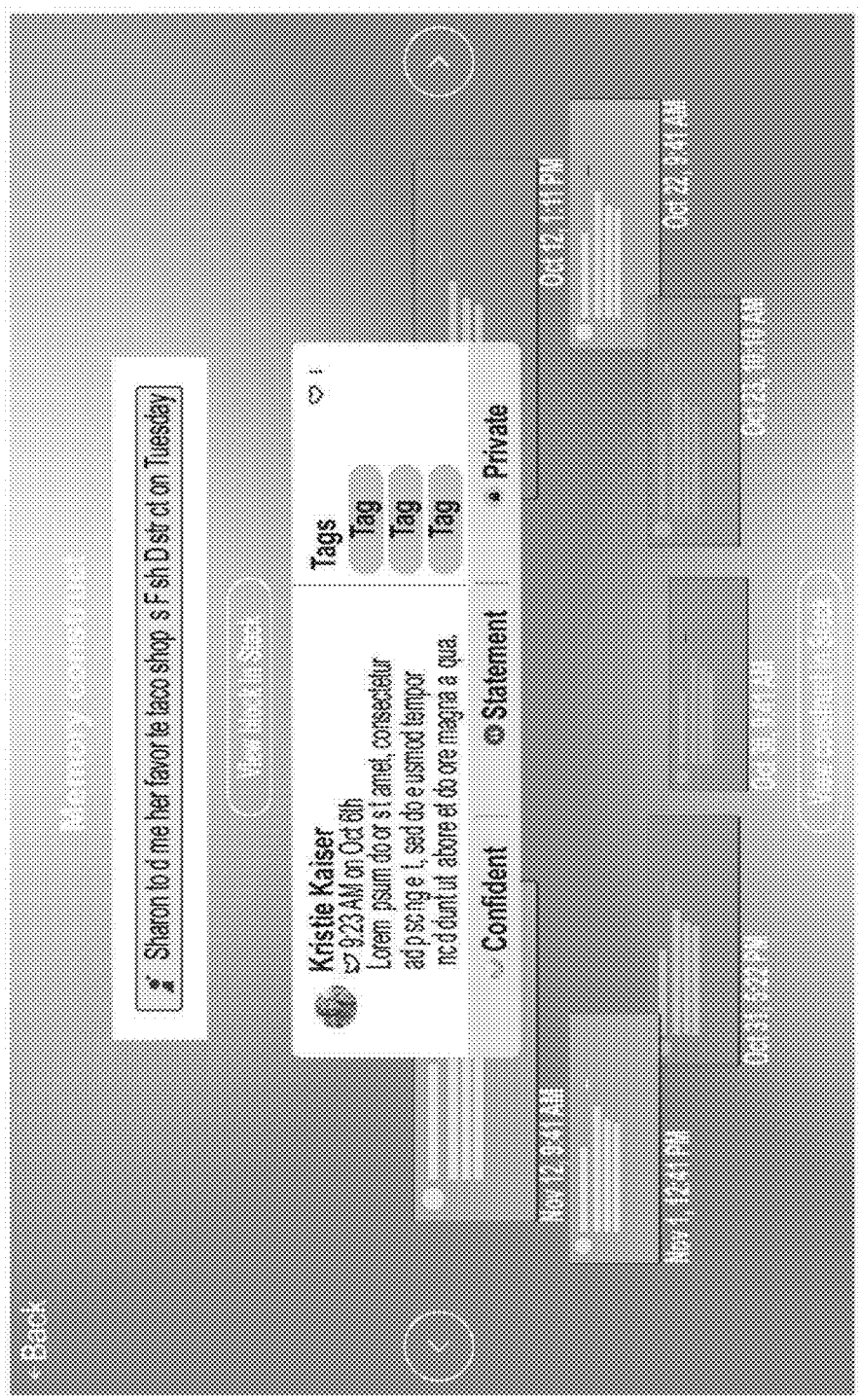
FIG. 7E illustrates an exemplary recall user interface, in accordance with some embodiments.

FIG. 7D illustrates another exemplary user interface, in accordance with some embodiments. Responsive to a user query, a drop-down menu 708 is displayed to provide a summary of the results from the query. In the depicted example, the drop-down menu indicates how many auto-complete suggestions are generated, how many top memory constructs (e.g., memory blocks) are identified, and how many relevant memory data structures are identified. The user can press <shift> to cause the auto-complete suggestions to be displayed one by one in text box 704. The user can press <enter> to launch a user interface for displaying the top memory constructs, as shown in FIG. 7E. As shown in FIG. 7E, the top memory constructs can be displayed in one or more batches and the memory constructs in each batch are displayed in an arrangement for easy exploration. The user can also invoke the memory stack from the drop-down menu to launch a timeline user interface (e.g., 8A) to view and explore the full set of relevant memory data.

The recall queries for the memory retention system can be specific, detailed, and broad. A specific query seeks a single entity (e.g., person, place, thing, time, concept), such as "Luther's CEO is." A detailed query seeks a longer answer composed of several linked entities, such as "who did I meet at Mac's Pub," "who did I visit with Marc in San Francisco," "who did I meet as a child," "who did I meet during college." A broad query seeks a list of several unlinked entities, such as "what did I do last week."

The categories of information that can be recalled or used as query terms include: metadata (e.g., person, time, location), content data (e.g., audio transcripts, texts, images), and generated data (e.g., emotion, summary). Examples include: person, location (specific location such as will's house and broad location such as Colorado), time (specific time such as an exact date/time, or a time range), an event (e.g., honeymoon, wedding, graduation, party), life stage (child, college student, married), a concept, a complete thought (e.g., a snippet), synthesized thought (e.g., a summary based on multiple blocks), etc. For example, the user may ask the system to "generate a memory timeline synopsis around a concept or topic we talk about."

In some embodiments, the recall queries are metadata-driven, for example: "When was the last time I met Rachel?" or "What did we talk about last time I emailed Rachel?" Metadata refers to attributes (e.g., people, time, location) that can be derived from feed sources (e.g., audio, calendar applications, email applications, messaging applications, sensors) or obtained from user feedback (e.g., tagging). In some embodiments, metadata further indicates the feed source of the memory data (e.g., the third-party application the data is from) and the feed type of the memory data (e.g., audio, text, image). Metadata information is explicit and accurate. The memory retention system can store metadata as memory bits, and each memory bit can be associated with a memory snippet, a memory block, and/or a memory event.

Metadata-driven queries are often formulated to contain <recall verb> <person> <time> < . . . >. The system can extract the recall verb from the query and derive query terms such as feed source, feed type, context, and emotion based on the recall verb. For example, [I met with] indicates that the source may be a calendar application, [I e-mailed] indicates that the source may be an email application, [I wrote to] indicates that the source may be a text application, [I spoke with] indicates that the source may be an audio application, [I asked] indicates that the memory is associated with a question, [I laughed with] indicates that the memory is associated with an emotion, etc.

The time in the query can be classified as relative time (specifying the relation between capture time and the current time such as "last time"), absolute time (e.g., "first time," "this Tuesday," "June 2020"), internal time, or event time. Further, the time can have different resolutions (e.g., month, week).

In some embodiments, the recall queries can driven by content data (e.g., "What did I say to Rachel at 2 pm yesterday") and/or by generated data (e.g., "What emotion did I feel during my call with Rachel"). Based on the query terms, the corresponding memory data structures can be retrieved as described herein.

In response to receiving a query, the memory retention system can produce results for the user. The results can include the precise answer (e.g. a memory bit), a sentence (e.g. memory snippet), a paragraph (e.g. memory block), and/or media data (e.g., images and videos). For example, a memory bit (e.g., time, people, location) is generally retrieved to complete a sentence, such as "I spoke to Kelly last time on <yesterday>" and "I spoke to Lakshmi about Diwali on <Saturday>." A memory snippet or a memory block is generally retrieved when the user wants to recall one or more sentences. For example, based on the user query "What did I tell Will about AWS cost on Monday," the system can retrieve one or more memory snippets/blocks associated with the concept or conversation.

In some embodiments, the system can automatically suggest changes to the user query. For example, if the system is not able to identify any result in response to the query, the system may suggest removing some query terms such that results can be returned. As another example, if the system identifies too many results (e.g., exceeding a predefined threshold), the system can automatically offer additional query terms to narrow the query.

In some embodiments, the system provides a timeline user interface for the user to view and explore his or her memory stack. The timeline user interface can be invoked, for example, when a user query (e.g., in user interface 700) returns too many results (e.g., exceeding a predefined threshold). In some embodiments, the timeline user interface can be invoked when the user wants to explore a particular memory data structure. For example, FIG. 7C, the user can invoke deep recall to review the recalled memory data in the context of the timeline user interface. In some embodiments, the system provides an entry point to the timeline user interface from the user interface 700.

FIG. 8A illustrates an exemplary user interface for exploring a user's memory stack, in accordance with some embodiments. With reference to FIG. 8A, in a panel 802, a plurality of memory segments are displayed. In the depicted example, a memory segment may correspond to a memory block described with reference to FIGS. 6A and 6B.

An exemplary memory segment 804 includes the content 806 (e.g., an audio transcription, an email, a tweet, a message, a video). The memory segment 804 further includes various context information associated with the memory segment. As discussed above, context information can include metadata and generated data, such as a graphical element 708 indicative of the author of the memory segment (e.g., the person who spoke the utterance), graphical elements 810 indicative of people associated with the memory segment (e.g., participants of the same meeting or conversation), and a graphical element 812 indicative of the source of the memory segment (e.g., Zoom, Slack, Twitter, Facebook). The memory segment 804 also includes an indicator 814 of an emotion associated with the memory segment and an indicator 816 of a synopsis of the content. The memory segment 804 also includes one or more tags 820. Tags 820 include metadata and generated data associated with the memory segment. The data can be automatically generated by the system, provided by the user, or any combination thereof. The tags can be added, removed, or modified by the user. For example, the system may automatically derive metadata for a memory segment based on a third-party calendar application (e.g., time, people, location) and generate data (e.g., emotion, summary) based on a transformer. The metadata and the generated data for the memory data structure can be displayed as tags in the timeline; the user can then modify, remote, or add tags as needed.

The user interface allows the user to manage the memory segments in his or her memory stack. For example, a user can favorite one or more memory segments (822), share or keep private one or more memory segments (818), archive one or more memory segments, permanently delete one or more memory segments, and/or export one or more memory segments to a different format (e.g., Excel, PDF, or JPG). After a memory segment is archived, it will be removed from the user's Stack and only visible in an archive section.

The user interface comprises a timeline 830. The zoom level of the timeline 830 can be adjusted by user control 840 to one of a plurality of predefined levels (e.g., years, months, weeks, days, hours). The timeline 830 can act as a scrollbar. When a user is scrolling up and down his or her feed panel 802, the timeline 830 can be updated to indicate the memory segments currently displayed in the panel 802.

The timeline comprises a plurality of clickable dots. Each dot can represent a single memory segment or a collection of memory segments. The size of the dot is indicative of the number of memory segments in the corresponding collection. In some embodiments, hovering on a dot can cause a tooltip with the number of memory segments to be displayed. The user can select a dot to select the corresponding memory segment or collection of memory segments on the timeline. Upon a user selection of a dot, the selected memory segment(s), as well as neighboring memory segments, can be displayed in the panel 802.

In some embodiments, the user can drag a time travel marker 832 along the timeline 830. In some embodiments, based on the scrolling speed (e.g., speed of dragging or mouse scrolling), the zoom level of the timeline can be updated accordingly. For example, as the scrolling speed of the time travel marker 832 increases, the timeline shifts from weeks to months to years.

Figure 8B:
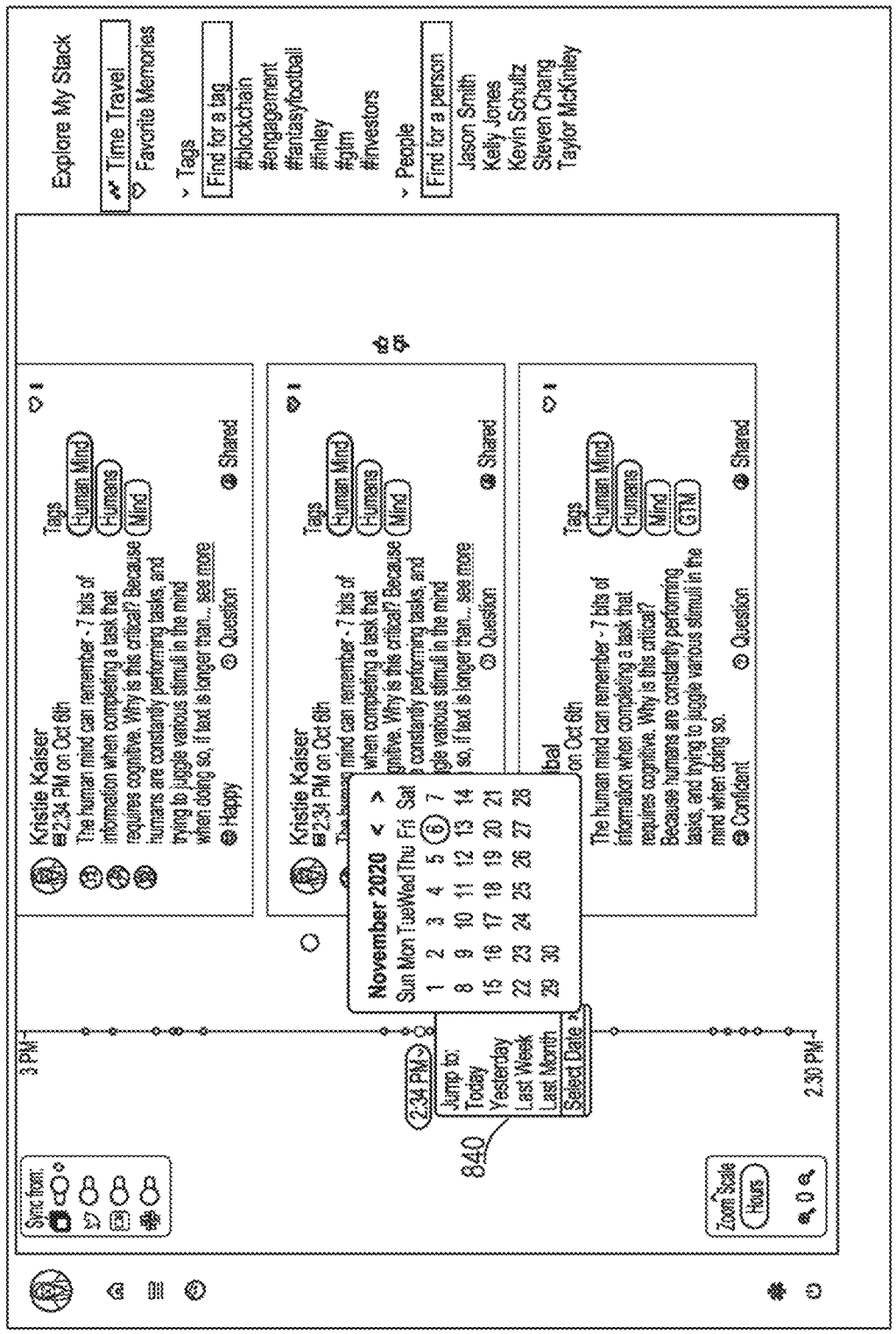
FIG. 8B illustrates an exemplary user interface of the memory retention system, in accordance with some embodiments.

With reference to FIG. 8B, the timeline comprises a user interface element 840 for selecting a predefined time point (e.g., most recent, yesterday, last week, last month, last year) or specifying a particular time. Upon a selection of the time, the timeline and the panel are updated accordingly.

The timeline provides a number of mechanisms for a user to select memory segment(s). A single memory segment can be selected from the timeline (e.g., 832 in FIG. 8A) or from the feed panel (e.g., 850 in FIG. 8C). Further, the user can add multiple memory segments to a selection (e.g., Shift+Click on the timeline or the panel). Further, the user can select multiple memory segments via a dragged area (e.g., Shift+Click+Drag) on the timeline, as shown in FIG. 7C. In the depicted example, the user drags a box around a portion of the timeline to select all 8 memory segments in the box. Further, the user interface can allow the user to select all visible dots on the timeline. After one or more memory segments are selected, the user can perform bulk actions on the selected memory segments, including favorite, export, delete, and archive, for example, by using the user controls on control bar 852.

Figure 8C:
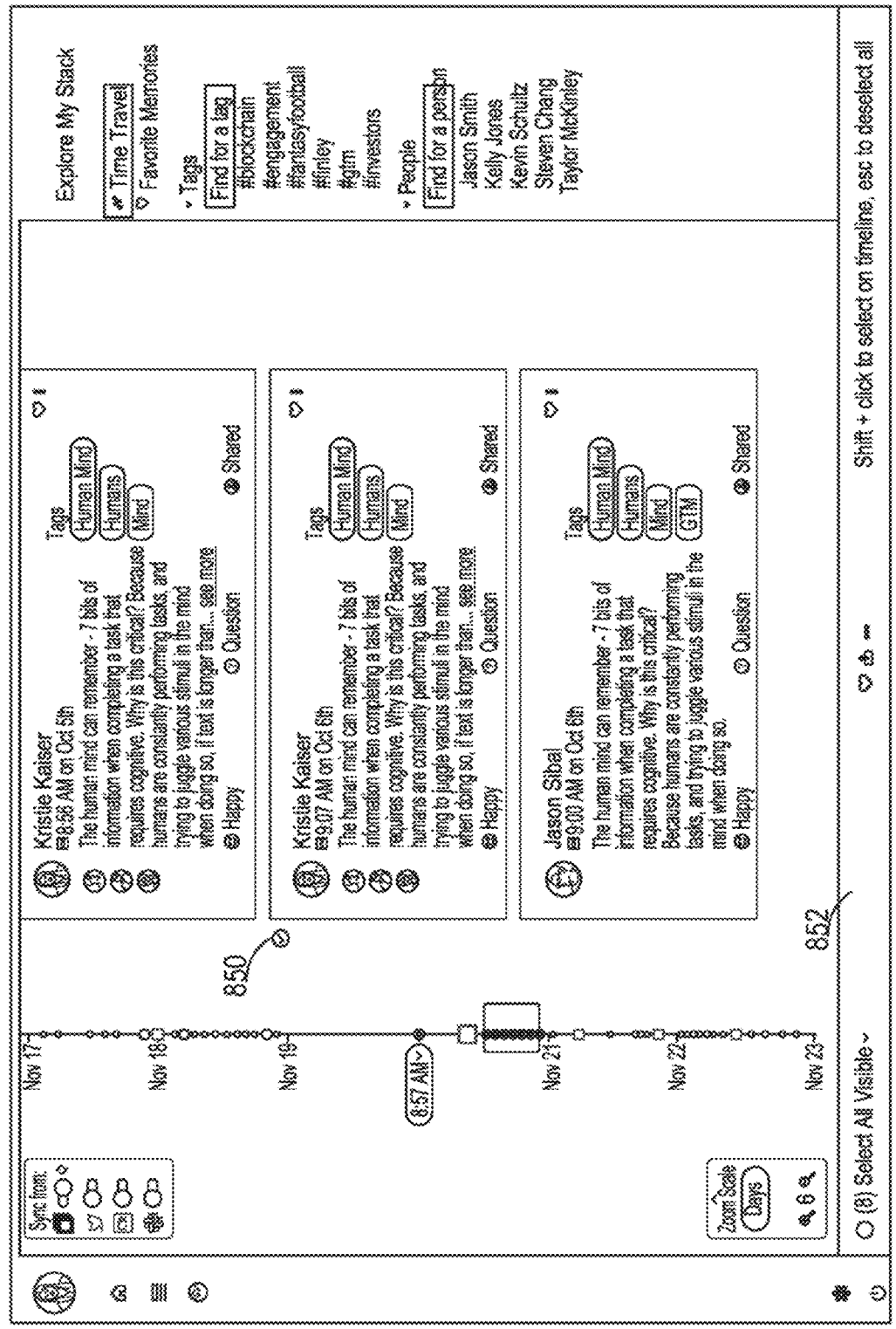
FIG. 8C illustrates an exemplary user interface of the memory retention system, in accordance with some embodiments.

In some embodiments, upon selection of memory segment(s), the timeline automatically indicate additional memory segment(s) that are related to the selected memory segment(s), for example, by highlighting the related memory segment(s) using a different color or showing the related memory segment(s) in a different shape on the timeline (e.g., square shape in FIG. 8C). Related memory segments may have the same or similar topics, people, tags, etc., as the selected memory segment. The user interface can allow the user to perform bulk actions on the selected memory segment(s) plus the related memory segments.

Collaboration Mode

As discussed above, each user in the memory retention system has his or her memory stack, which includes memory data structures such as memory chunks, memory blocks, and/or memory snippets. In some embodiments, the memory retention system allows the user to access another user's memory stack.

With reference to FIG. 7A, the user interface 700 by default provides results based on the user's own memory stack. The user can choose to add a second memory stack by click a "+" button and specifying a second user, as shown by 706. In some embodiments, the user interface 700 displays previously used memory stacks for easy selection. In some embodiments, the user interface 700 allows the user to reorder the selected memories stacks. In some embodiments, the user can select other users' memory stacks and deselect his or her own memory stack.

After the memory stacks are specified, the user's recall query is executed on the specified memory stacks. When displaying the results to the recall query, the system can specify which user each result originates from. In some embodiments, a result from another memory stack may be private, and the user interface allows the user to request access to the result. A user can choose to grant access to some or all of his or her memory stack, which will allow anyone to use their recall interface to add the memory stack.

In some embodiments, the recall interface provides the option to set the collaboration mode to "parallel" or "serial." In parallel mode, when the user starts typing, the top recall response will be autocomplete from the first memory stack. The user can press <shift>, to see the first recall response from the second memory stack, and so on. The shift shuffles until the max responses from each memory stack in order is shuffled through. In serial mode, when the user starts typing, the top recall response will be autocomplete from the first memory stack. The top response from the second memory stack is appended to the text as a full sentence. A tab can accept one response at a time and jumps to the next one when accepted.

Figure 9:
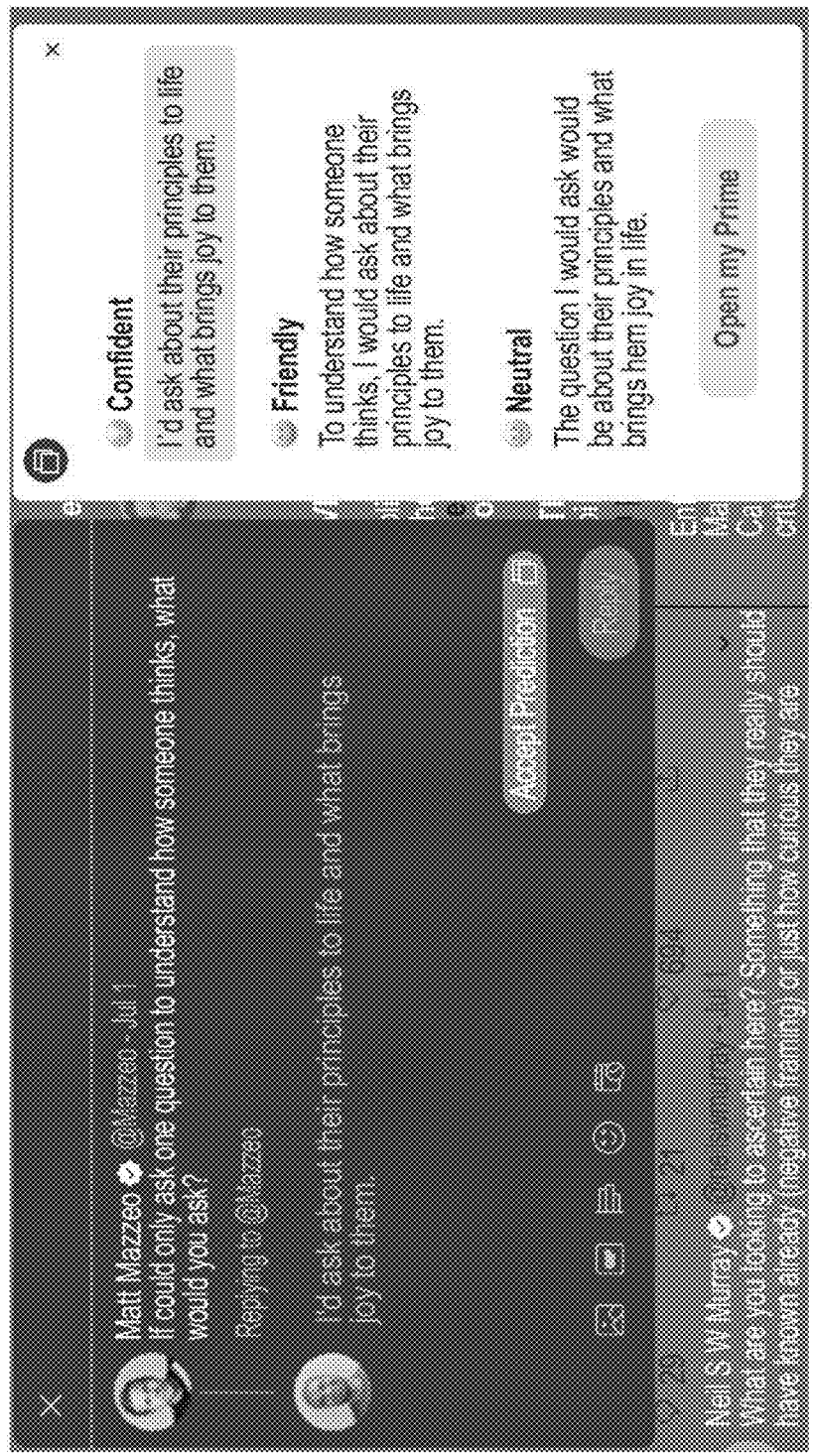
FIG. 9 illustrates an exemplary recall user interface within an integrated third-party application, in accordance with some embodiments.

FIG. 9 illustrates an exemplary recall user interface within an integrated third-party application, in accordance with some embodiments. The memory retention system allows the user to have her thoughts, ideas, and opinions from past conversations to coalesce into suggested Twitter posts, blurbs, and team updates. Accordingly, the user can save time by receiving suggested responses to certain tweets, and by receiving auto-complete suggestions as user composes a tweet.

In some embodiments, in the memory retention app (e.g., application 654), users can choose a user account in Twitter and have the memory retention system auto-generate responses to all new tweets from that user account. For each tweet, the user can view the generated response(s) as shown in FIG. 9. In some embodiments, the user interface further provides options to accept/shuffle/edit/cancel. The accept option causes the generated response to be posted in the original thread. The shuffle option can cause a new prediction to be displayed based on the feedback just provided. The edit option allows the user to edit the suggested post and then post. The discard option removes the predicted post and the memory retention scores the prediction low, which can be used to retrain one or more of the models.

In some embodiments, the memory retention system can automatically create new tweets. For example, the memory retention system can propose new tweets based on recently generated memories in the memory stack. The memory retention system can proactively display the new tweets and allow the user to accept/shuffle/edit/cancel as desired.

In some embodiments, the users can have the option to connect with Twitter to fetch existing and new tweets to create memory data. For example, each tweet may generate one memory snippet and a twitter thread may generate a memory block. Context data for the memory data can be derived from the metadata from the Twitter platform, such as timestamps of the tweets.

FIG. 10 illustrates an exemplary recall user interface within an integrated third-party application, in accordance with some embodiments. The third-party application is a text editing application (e.g., Google Docs, Medium, Microsoft Office). While editing a document, the editor can invoke the memory retention system, specifically, a particular user's memory stack and transformers. In some embodiments, the memory retention system is invoked by granting access of the document to a particular user of the memory retention system (e.g., inviting googledocs@john.personal.ai to edit the Google Docs document). In response to invoking the memory retention system, the system can automatically process the existing text 1002 in the document and automatically suggest content 1004. The content can be created by identifying query terms (e.g., concepts, topics, entities) in the writing 1002, retrieving memory data from the memory stack based on the identification, and composing content based on the memory data. The content can include most relevant memory data, a summary of relevant memories, a paraphrasing of relevant memories, or a combination thereof. The composed content can conform to the writing style of the invoked user and/or the style of the third-party application. As the editor enters additional text, the memory retention system can automatically suggest new content based on the additional text.

User-Specific Pods

The memory retention system ensures that user-specific memory data remains private and secure, and that user transformers are fully customizable per user and available for use in real time. In some embodiments, a user-specific pod structure is allocated when a user is actively using the memory retention system (e.g., actively retaining or recalling memory data). The user-specific pod structure is similar to an instance of a personal computer on the cloud. Specifically, during each user's active session, a specific pod structure is allocated and the pod structure would be in use solely for that user—both for storage and compute.

In some embodiments, a user pod structure is a collection of user-specific resources at runtime. Each pod comprises a module for providing the recall experience and share AI experience (including the recall user interfaces), and a module for building and browsing the memory stack (including stack user interfaces and the feeds user interfaces). In some embodiments, when the user starts an active session, all of the modules are activated. In some embodiments, only some of the modules are activated, for example, because a user may be active on feed but not active on recall. These modules can operate with a user-specific permanent storage, which stores user-specific memory data, models, handlers, history, settings, etc. When the user ends the active session, the memory can be deallocated and reallocated for the pod structure of another user.

In some embodiments, a user pod, similar to a computer, can be turned off and on or put into sleep mode. The characteristics of a user pod is similar to a cloud resource except that the pod contains more than one cloud resource. The automation of turning on/off a pod can meet expectations of a private and personal AI, scale to millions of users, optimize for costs, and facilitate faster development process.

In some embodiments, each compute component (e.g., transformer, search, etc.) is containerized in the pod structure; each data store component (e.g., memory stack, model) is containerized; and/or each transient store (e.g., cache) component is containerized.

AI Intranet Protocol ("AIP")

In some embodiments, each user in the memory retention system is assigned a unique universal address or handle. The address serves as an interface to the user's memory data in the memory retention system. The address can be in the form of "@ [unique user name] [domain name]." For example, John's address can be @john.hu.man.ai, and Jane's address can be @jane.hu.man.ai. In some embodiments, the address includes additional fields for indicating different contexts, for example, "@ [unique user name] [workspace/team/company name] [domain name]." In some embodiments, the address is created when the user first signs up with the memory retention system. During the sign-up process, the user can create a unique user name.

The user's address serves as the universal unique intranet address endpoint accessible anywhere on the Internet to invoke various capabilities of the memory retention system. For example, after the address @john.hu.man.ai is created, https://john.hu.man.ai can be entered into a web-browser to access a website providing the memory data of John. If the user is logged in, the website can show various user interfaces (e.g., FIGS. 7A-7C) for recalling John's memory data. If the user is not logged in, the website can show John's public profile and allow a user to log in, subscribe, etc.

Further, on a third-party platform, the address can be used to invoke the integrated recall functionality on the third-party platform. For example, on Twitter, when @john.hu-.man.ai is tagged, the Twitter recall API can be invoked to automatically compose tweet content, as described with reference to FIG. 9.

In some embodiments, the memory retention system provides multiple domains for a user. For example, John can have two addresses John.hu.man.ai" and "john.mystack.ai." The different domains can be used to access different functionalities of the memory retention system. For example, "John.mystack.ai" can be used to browse and edit the user's memory stack (e.g., FIGS. 8A-C) and configure user settings, while "john.hu.man.ai" can be used to access the user's public profile, perform recalls, and can be used on third-party platforms (e.g., Alexa, Chrome plug-in, etc.).

The implementation of multiple addresses allows segregation of storage/compute for stack needs (e.g., managing and maintaining the user's memory stack) and recall needs. It also provides a higher level of security, privacy, and reliability.

Figure 5:
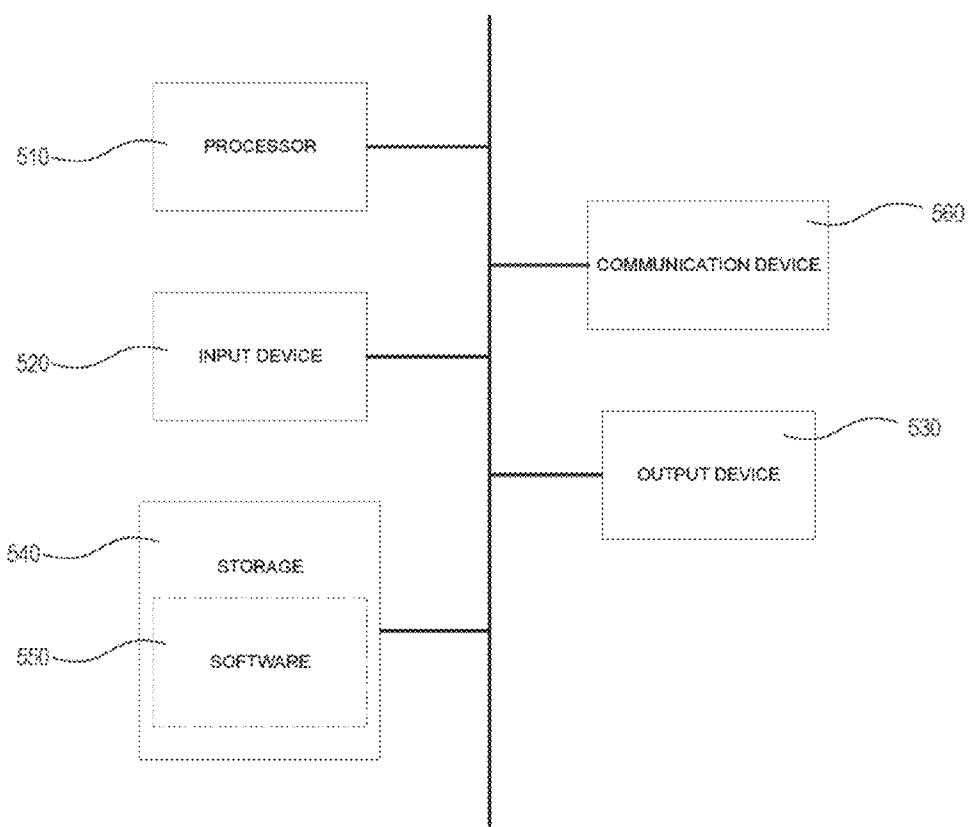
FIG. 5 depicts an exemplary electronic device in accordance with some embodiments.

The operations described above are optionally implemented by components depicted in FIG. 5.

FIG. 5 illustrates an example of a computing device in accordance with one embodiment. Device 500 can be a host computer connected to a network. Device 500 can be a client computer or a server. As shown in FIG. 5, device 500 can be any suitable type of microprocessor-based device, such as a personal computer, workstation, server or handheld computing device (portable electronic device) such as a phone or tablet. The device can include, for example, one or more of processor 510, input device 520, output device 530, storage 540, and communication device 560. Input device 520 and output device 530 can generally correspond to those described above, and can either be connectable or integrated with the computer.

Input device 520 can be any suitable device that provides input, such as a touch screen, keyboard or keypad, mouse, or voice-recognition device. Output device 530 can be any suitable device that provides output, such as a touch screen, haptics device, or speaker.

Storage 540 can be any suitable device that provides storage, such as an electrical, magnetic or optical memory including a RAM, cache, hard drive, or removable storage disk. Communication device 560 can include any suitable device capable of transmitting and receiving signals over a network, such as a network interface chip or device. The components of the computer can be connected in any suitable manner, such as via a physical bus or wirelessly.

Software 550, which can be stored in storage 540 and executed by processor 510, can include, for example, the programming that embodies the functionality of the present disclosure (e.g., as embodied in the devices as described above).

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-implemented method, comprising:
obtaining a speech input of a user;
constructing an instance of a memory data structure based on the speech input, wherein the instance comprises a paraphrase of the speech input and is associated with a set of context parameters, and wherein data associated with the instance of the memory data structure is obtained at least partially using a neural network;
adding the instance of the memory data structure to a memory stack of the user;
obtaining an input;
retrieving the instance of the memory data structure from the memory stack of based on input; and
causing display of at least a portion of the paraphrase based on the retrieved instance of the memory data structure.

2. The method of claim 1, wherein the input comprises a beginning of a statement from the user, and wherein causing display of at least the portion of the paraphrase comprises causing display of a completion of the statement.

3. The method of claim 1, wherein the input comprises a message from a sender to the user, and wherein causing display of at least the portion of the paraphrase comprises causing display of a response to the message.

4. The method of claim 1, wherein the input comprises one or more sentences entered into a document in a text processing application, and wherein causing display of at least the portion of the paraphrase comprises causing display of a proposed sentence in the text processing application.

5. The method of claim 4, further comprising:
receiving an input granting access of the document to a user account associated with the memory stack of the user; and
upon granting access of the document, automatically analyzing the one or more sentences to generate the proposed sentence.

6. The method of claim 1, further comprising: obtaining the set of context parameters associated with the speech input.

7. The method of claim 6, wherein the set of context parameters comprises one or more entities extracted from the speech input.

8. The method of claim 6, wherein the set of context parameters comprises one or more emotions extracted from the speech input.

9. The method of claim 6, wherein the set of context parameters comprises a summary of the speech input.

10. The method of claim 6, wherein the set of context parameters comprises a concept extracted from the speech input.

11. The method of claim 1, further comprising: obtaining the paraphrase associated with the speech input.

12. The method of claim 11, wherein obtaining the paraphrase associated with the speech input comprises applying a language model to a transcript of the speech input.

13. The method of claim 12, further comprising correcting at least one of grammar or semantics of the speech input.

14. The method of claim 1, wherein the instance of the memory data structure is a first instance of the memory data structure, the method further comprising:
obtaining a text input of the user;
constructing a second instance of the memory data structure based on the text input, wherein the second instance comprises a paraphrase of the text input;
adding the second instance of the memory data structure to the memory stack of the user.

15. The method of claim 14, wherein obtaining the paraphrase associated with the text input comprises applying a language model to the text input.

16. The method of claim 15, further comprising correcting at least one of grammar or semantics of the text input.

17. A system, comprising: one or more processors; a memory; and one or more programs, wherein the one or more programs are stored in the memory and configured to be executed by the one or more processors, the one or more programs including instructions for:
obtaining a speech input of a user;
constructing an instance of a memory data structure based on the speech input, wherein the instance comprises a paraphrase of the speech input and is associated with a set of context parameters, and wherein data associated with the instance of the memory data structure is obtained at least partially using a neural network;
adding the instance of the memory data structure to a memory stack of the user;
obtaining an input;
retrieving the instance of the memory data structure from the memory stack of based on input; and
causing display of at least a portion of the paraphrase based on the retrieved instance of the memory data structure.

18. A non-transitory computer-readable storage medium storing one or more programs, the one or more programs comprising instructions, which when executed by one or more processors of one or more electronic devices, cause the electronic devices to:
obtain a speech input of a user;
construct an instance of a memory data structure based on the speech input, wherein the instance comprises a paraphrase of the speech input and is associated with a set of context parameters, and wherein data associated with the instance of the memory data structure is obtained at least partially using a neural network;
add the instance of the memory data structure to a memory stack of the user;
obtain an input;
retrieve the instance of the memory data structure from the memory stack of based on input; and
cause display of at least a portion of the paraphrase based on the retrieved instance of the memory data structure.

\* \* \* \* \*